United States Patent [19]

Momot et al.

[11] Patent Number: 4,806,960
[45] Date of Patent: Feb. 21, 1989

[54] CASSETTE INFORMATION CONTROLLER AND MEMORY

[75] Inventors: David Momot; Ensley E. Townsend; Michael W. LaCourt, all of Rochester, N.Y.

[73] Assignee: Eastman Kodak Company, Rochester, N.Y.

[21] Appl. No.: 142,578

[22] Filed: Jan. 11, 1988

[51] Int. Cl.$^4$ .................... G03B 17/18; G03B 17/26
[52] U.S. Cl. .................................. 354/21; 354/275; 354/289.1
[58] Field of Search ............... 354/21, 275, 289.1; 352/72, 78 R, 78 C

[56] References Cited

U.S. PATENT DOCUMENTS

| | | | |
|---|---|---|---|
| 2,989,906 | 6/1961 | Rentschler | 95/11 |
| 3,260,182 | 7/1966 | Nerwin | 95/31 |
| 3,672,604 | 6/1972 | Beaumont | 242/199 |
| 3,705,699 | 12/1972 | Siller | 242/199 |
| 3,718,290 | 2/1973 | Wright | 242/199 |
| 3,724,935 | 4/1973 | Batter, Jr. | 352/38 |
| 3,877,045 | 4/1975 | Bloom et al. | 354/275 |
| 3,898,681 | 8/1975 | Hertel et al. | 354/216 |
| 3,967,292 | 6/1976 | Delahunt | 354/174 |
| 4,023,194 | 5/1977 | Batter, Jr. | 354/317 |
| 4,185,793 | 1/1980 | Stuzzi | 242/199 |
| 4,188,052 | 2/1980 | Erlichman | 354/202 |
| 4,338,644 | 7/1982 | Staar | 360/132 |
| 4,443,077 | 4/1984 | Tanikawa | 354/21 |
| 4,500,183 | 2/1985 | Tanikawa | 354/21 |
| 4,573,084 | 2/1986 | Iida | 358/300 |
| 4,652,939 | 3/1987 | Baumeister | 358/342 |

*Primary Examiner*—Michael L. Gellner
*Attorney, Agent, or Firm*—Dennis R. Arndt

[57] ABSTRACT

A cassette has semiconductor memory circuits in a microcontroller and display means which are capable of presenting information from the memory about both the cassette and the web material contained therein. A power source is provided in the housing to operate both the memory and the display when the cassette is not associated with a host photographic device. When the cassette is operatively positioned in the host photographic device, interfacing means are provided for establishing a two-way communications path between the memory in the cassette and the photographic device. Recording means associated with the photographic device are provided for renewing or updating a portion of the data recorded in the memory within the cassette via the interface. In addition, reproducing means associated with the photographic device reproduces a portion of the data previously stored in the memory in the cassette for use by the photographic device.

9 Claims, 17 Drawing Sheets

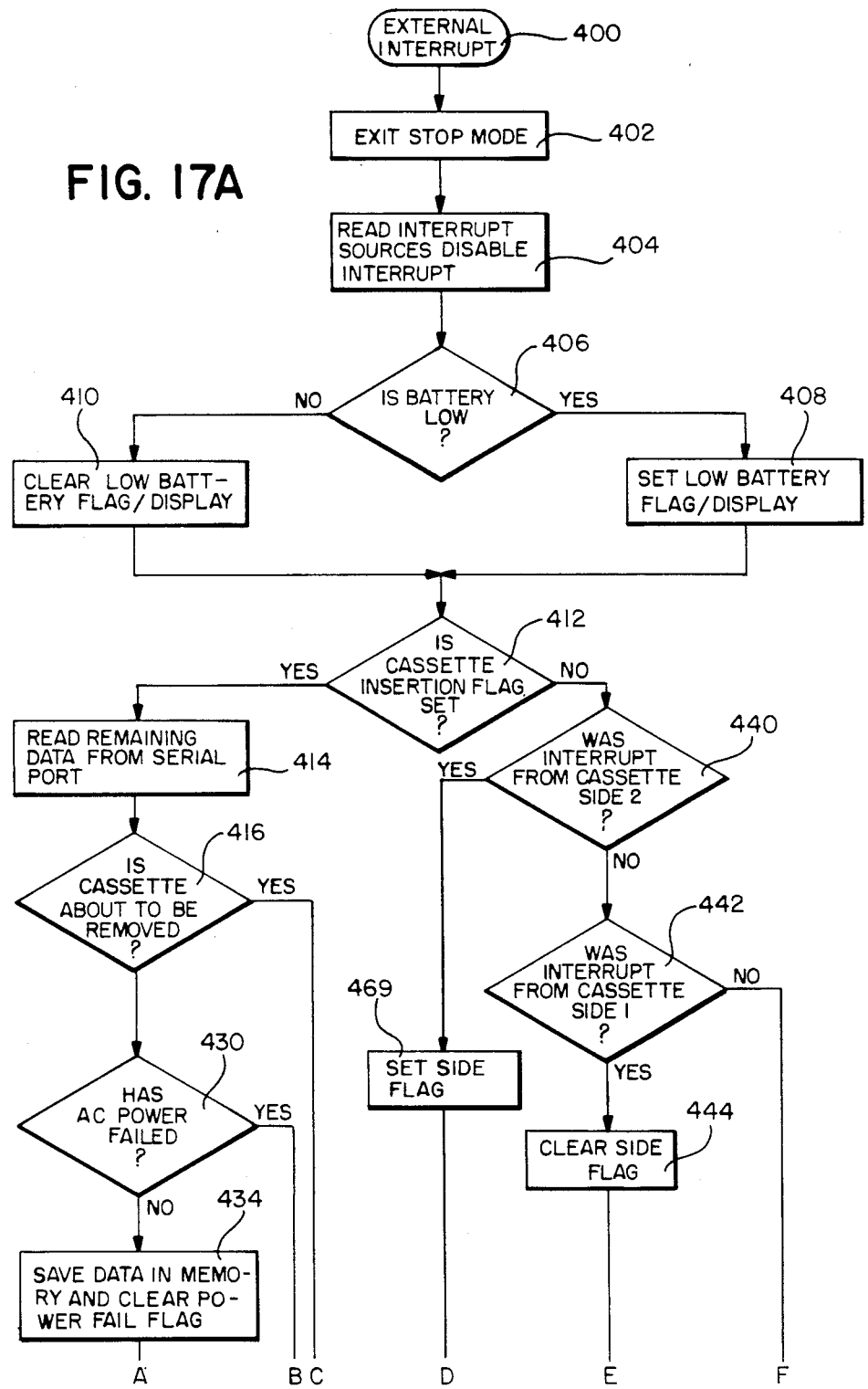

CASSETTE INFORMATION CONTROLLER AND MEMORY

CROSS REFERENCE TO RELATED APPLICATIONS

Reference is made herein to the following commonly-assigned, copending U.S. patent applications Ser. No. 141,864, entitled: MICROFILM CASSETTE, in the name of M. LaCourt, Ser. No. 142,579, entitled: FILM CASSETTE, in the name of M. LaCourt; Ser. No. 142,577, entitled: CASSETTE ORIENTATION DETECTION APPARATUS, in the name of E. Townsend; Ser. No. 142,576, entitled: CASSETTE/MACHINE OPTICAL COUPLED INTERFACE, in the names of D. Momot and E. Townsend, filed concurrently herewith.

1. Technical Field

The present invention relates to a film cartridge or cassette containing a film information center comprising an electrical interface with the photographic host device, a memory, an electronic display and a power source.

2. Background Art

The present invention relates to a film cassette adapted to be inserted in and removed from a film chamber in a photographic device such as in a microfilm camera.

It is well known to provide memory circuits in a film cassette so that when a cassette is placed in a camera, the memory circuits are readable by the circuitry in the camera. The camera can then ascertain the type of film contained within the cassette, the amount of unexposed film remaining in the cassette in either feet or in the number of remaining frames as well as other parameters and characteristics of the film contained therein. Exemplary of this development are the systems described in U.S. Pat. Nos. 4,338,644; 4,500,183; and 4,443,077.

A disadvantage associated with conventional film cassettes supplied by some manufacturers is that they include a film footage meter which indicates the amount of unexposed film remaining in the cassette. However, this meter or indicator is usually located on the camera housing itself. As a result, if a film cassette is removed from the camera before reaching the end of the film, the cassette itself bears no indication of the amount of unexposed usable film remaining in the cassette. Further, some cameras of the type described have no means to indicate to the operator the approaching end of the reel of film in the cassette.

It is also a present problem with some currently supplied cassettes that contain a memory device on or in the cassette that the memory may be accessed by the camera or the recording device, but is incapable of conveying information to an operator when the cassette has been removed from the camera or recording means. In addition, the cassettes supplied in the past were reliant on the power source in the camera or recording means and could only receive in memory updateable information from the host camera. The cassette was not capable of preserving in memory information or conditions that the cassette had been exposed to or experienced while not in the camera.

It is an object of the present invention to provide a film cassette that has an electronic display to convey a variety of conditions and parameters about the film contained in the cassette.

An additional object of the present invention is the provision of a film cassette including a power source within the cassette to operate the display and update the memory circuits and/or display with information relating to the conditions or use that the cassette had been subjected to while not in the camera or recording device. For example, the film cassette could alert the operator to the fact that the cassette had been open thereby alerting the operator that possible film exposure had occurred or that the film was removed from the cassette and the cassette was now empty.

While the preferred embodiment of this invention is directed to a film cassette for microfilm cameras, many of the features of the present invention are not limited to microfilm cassettes, or in that fact, to cassettes containing film. The present invention concepts are equally applicable to other applications or a different web material, such as magnetic tape or the like as supplied in a cartridge or magazine for use in a device.

DISCLOSURE OF THE INVENTION

It is the object of the present invention to provide a film cassette for use with a photographic device such as a microfilm camera. The cassette has a housing which includes supply and take-up means within the housing. The improved film cassette includes semiconductor memory circuits for representing by the state of said circuits, information as to the cassette or the film contained therein. Also carried by the cassette housing is a display means such as a liquid crystal display which is capable of presenting information from the memory about both the cassette and the film contained therein. A power source is provided in the housing to operate both the memory and the display when the cassette is not associated with a photographic device. When the cassette is placed in the operative position in the photographic device, interfacing means are provided for establishing a two-way communications path between the memory means in the cassette and the photographic device. Recording means associated with the photographic device are provided for renewing or updating a portion of the data recorded in the memory within the cassette via the interface. Reproducing means associated with the photographic device reproduces the data previously stored in the memory in the cassette for use in the photographic device.

BRIEF DESCRIPTION OF THE DRAWINGS

Modes of carrying out the invention will be described with reference to the drawings wherein:

FIGS. 17a-d are flowcharts illustrating the functions of the cassette information controller and memory after insertion of the cassette into the photographic device.

MODES OF CARRYING OUT THE INVENTION

A preferred embodiment of the film cassette according to the present invention will be described in detail with reference to the drawings.

Figure 1:
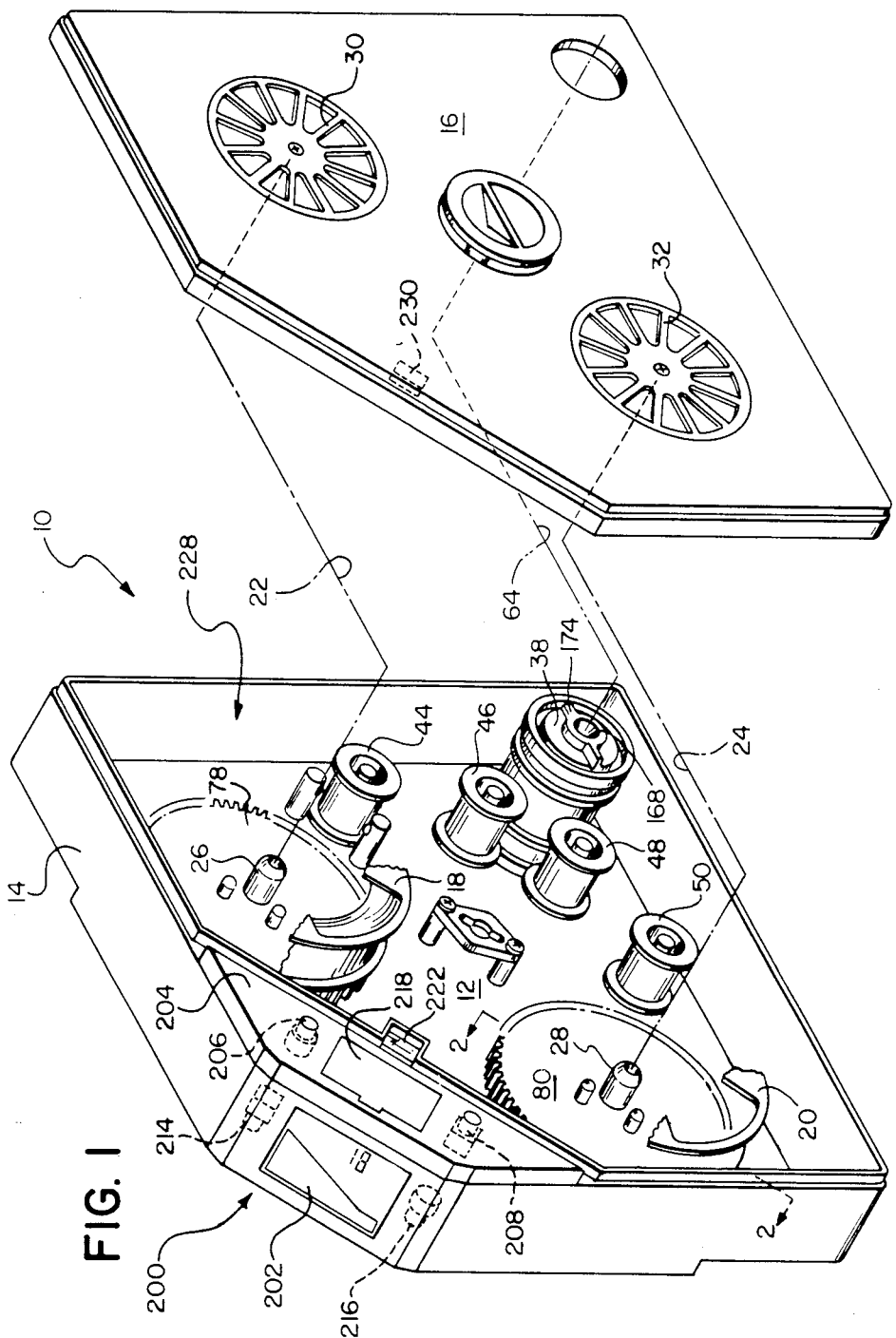
FIG. 1 is a diagrammatic perspective view of a microfilm cassette with the lid removed and embodying features of the present invention.

Referring to FIG. 1, the film cassette 10 embodying the present invention includes a cassette housing which is generally in the form of a substantially square base 12 having raised edge walls 14 around its periphery. A light-tight lid 16 is adapted to be fitted over the edge walls 14 of base 12. First and second reels 18, 20 may act as either film supply or take-up reels and are mounted with parallel axes of rotation 22, 24 respectively and in general are in coplanar relationship on the base 12 and supported by means of a pair of axial shafts 26, 28. The reels are held on the shafts by the light-tight lid 16 when it is attached to the edge walls 14 of the square base 12. These reels can be rotated in either direction from the exterior of the cassette 10 by star drives 30 and 32 in lid 16. The base 12 has similar drives (not shown), which are aligned on the axes of rotation 22 and 24. These star drives are engaged by drive spindles 164 and 166 in the microfilmer camera. A metering roller 38 is adapted to float freely until it is aligned with a pair of locating pins 40, 42 which are substantially parallel to the reel shafts 26, 28. The metering roller 38 can also be rotated in either direction by the external drive means, as will be discussed later in greater detail. A pair of "wobbly" idler rollers 44, 46, and 48, 50 are located between each of the reels 18, 20 and the metering roller 38.

Figure 4:
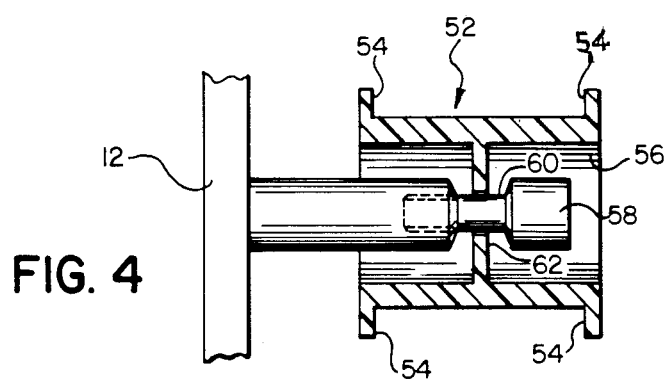
FIG. 4 is an elevation, partially in section, of a bidirectional idler roller according to the present invention.

The construction of the "wobbly" idler rollers 44, 46, 48, and 50 is shown in detail in FIG. 4 with all four idler rollers being constructed the same. The "wobbly" idler rollers steer the web between metering roller 38 and the film reels 18 and 20. A hard plastic mechanical flanged roller 52, with the distance between flanges 54 being slightly greater than the width of the film, is used. The roller has a cylindrical hole 56 passing through its center, so that the roller may be slipped over a shaft 58 of substantially uniform diameter. The interior diameter of cylindrical hole 56 is not uniform, as can be seen from FIG. 4. The mid-portion of the opening has a reduced diameter, approximately in the center section. Therefore, the idler roller, when placed on a shaft 58, will be free to wobble slightly about the smaller diameter portion 62 of cylindrical hole 56 where it engages a necked-down portion 60 of the shaft 58. Thus, the roller tends to assume a position that is laterally aligned with either metering roller 38 or one of the reels 18 and 20. Thus, the outer sleeve of the roller 52 between flanges 54 can tilt to accommodate film that approaches idler roller 52 in a position not in proper alignment, therewith.

In operation, should there be any misalignment of the film in its course of travel, which is due on occasion to one reel or another not being in proper alignment with the metering roller or perhaps due to an irregularity in winding the film on the reel, the wobbly idler roller will tend to compensate for these conditions. Because the film is not flexible in the plane of the film, the film will force the outer sleeve of the roller to a tilted position as illustrated in FIGS. 6A-C, and FIG. 7. This tilting will therefore avoid wrinkling or distorting the film at one or both edges, a condition that may otherwise occur, but for the "wobbly" roller.

The idler rollers 44, 46, 48, and 50 are also capable of being positioned laterally by the film by moving axially along shaft 58. Lateral motion of the roller is restricted to the width of the necked-down portion 60 of shaft 58 on which the reduced bore portion 62 of cylindrical hole 56 moves. Film passing between the shoulders defined by flanges 54 on the roller is constantly urging the roller laterally in one or the other direction along shaft 58. As used herein, the term "lateral" is used in the same sense with respect to the film, the cassette, the reels and the rollers, e.g., endwise movement of the rollers is referred to as "lateral". Thus, the roller can shift to accommodate changes in the effective width of the film increases within permissible tolerance, or edge waviness, which causes cyclic variations in lateral motion.

Loading of The Cassette

A full roll of unexposed film on a standard reel 18 provided by the film manufacturer is placed within the cassette, either in a darkroom or by allowing a few convolutions of film on the reel to become exposed. During this loading procedure, a short length of film is withdrawn from the new roll, threaded over the first pair of idler rollers, 44, 46 metering roller 38, the second pair of idler rollers 48, 50 and cinched onto the empty reel 20. Each of these idler rollers 44, 46, 48 and 50 can float laterally along their shaft and assume an infinite number of angular positions with a range of approximately 20 degrees.

Figure 5:
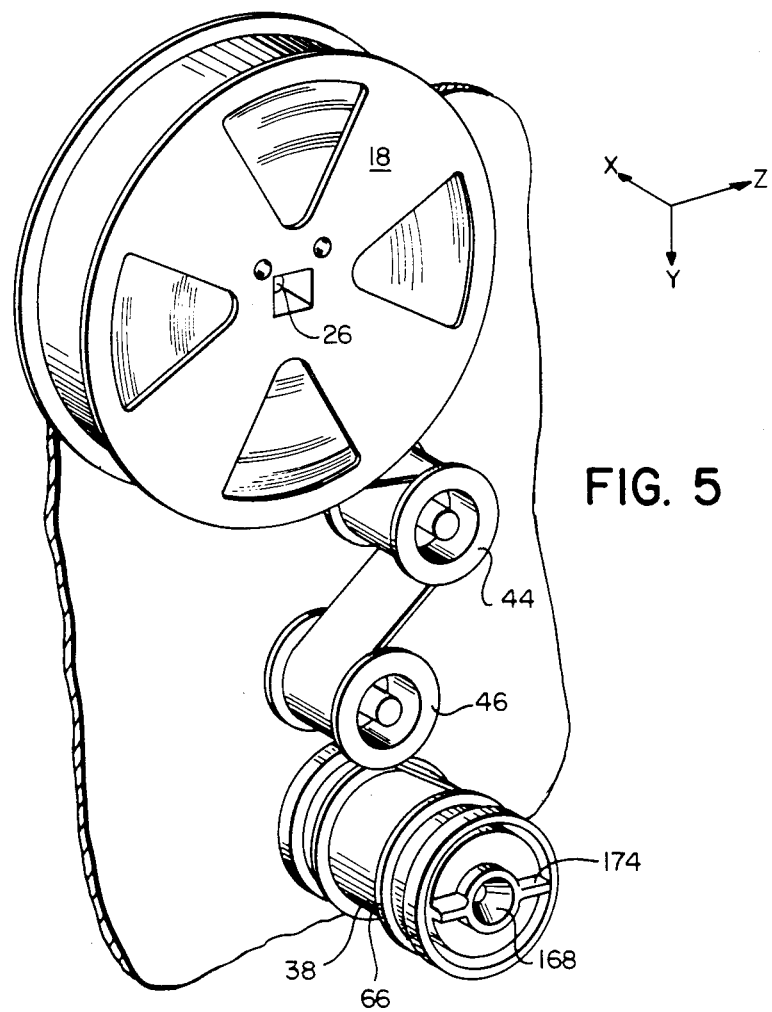
FIG. 5 is a perspective view of a portion of the structure shown in FIG. 1 with the film carried thereon.
Figure 6A:
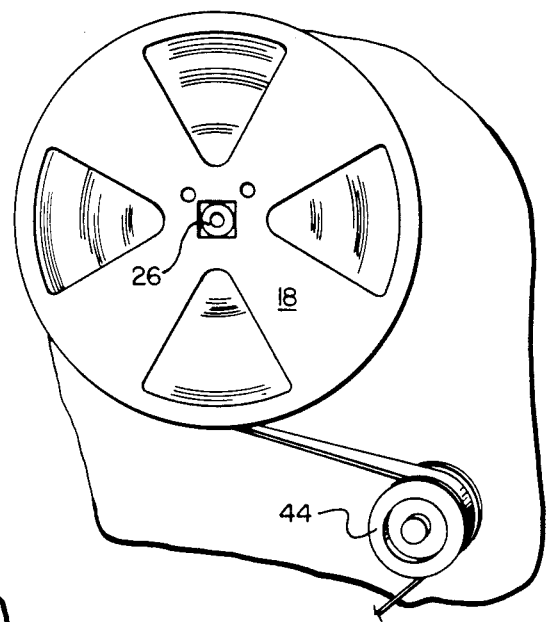
FIG. 6A is a fragmentary view taken between a film reel and a film idler roller.

FIG. 5 illustrates the film path from the supply reel 18 to metering roller 38. The film path is displayed relative to an XYZ coordinate system. The metering roller axis of rotation 64 and the supply reel axis 22 are rigidly fixed in space at some small angle relative to the X-axis, due to manufacturing tolerances. The lateral position of the web with respect to the Z-Y plane is confined between flanges 66 of metering roller 38 and the flanges of supply reel 18. There are three web spans between the reel 18 and metering roller 38, they are between supply reel 18 and idler roller 44, idler rollers 44 and 46, and between idler roller 46 and metering roller 38 as shown in FIG. 5. FIG. 6A, B and C illustrate a view which is perpendicular to the edge of the film for each of these film spans in FIG. 5 respectively and illustrates how the "wobbly" roller can facilitate the steering of each segment of the web.

In FIG. 6A, the direction of the film leaving the reel must be perpendicular to reel axis 22 because the film resists bending within the plane of the film. Therefore, the axis of idler roller 44 must align itself parallel to the axis of reel 18. The angular position of the axis of the idler roller 44 with respect to the X-axis will track the angle of the axis of rotation 22 for reel 18 with respect to the X-axis when viewed perpendicular to the web span.

Figure 6B:
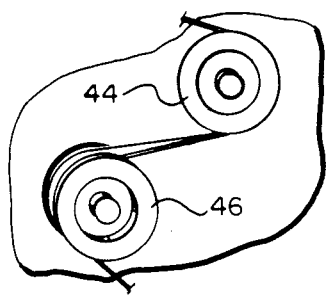
FIG. 6B is a fragmentary view taken between first and second idler rollers.
Figure 6C:
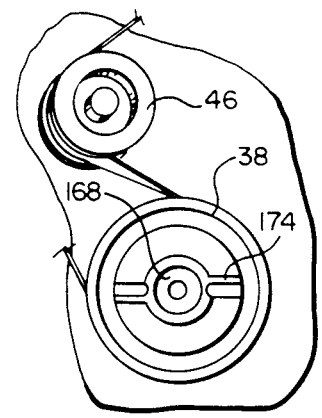
FIG. 6C is a fragmentary view taken between a second idler roller and the film metering roller.

In a similar fashion, as can be seen in FIG. 6C, the film must engage metering roller 38 perpendicular to its axis of rotation 64 at a fixed lateral position. The axis of idler roller 46 is parallel to the axis 64 of metering roller 38 when viewed perpendicular to the web span.

As shown in FIG. 6B the lateral positions of idler rollers 44 and 46 have essentially been dictated by metering roller 38 and film reel 18 respectively. Because the web is assumed to be stiff within the plane of the film, both the axes of the idler rollers 44 and 46 must be parallel to each other in the plane of the connecting film span.

Figure 6D:
FIG. 6D is a cross-section of the web taken between idler rollers.
Figure 8:
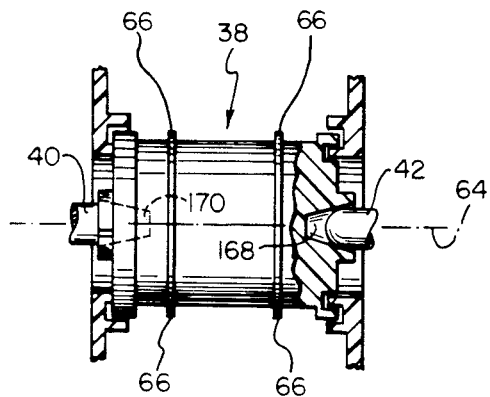
FIG. 8 is an elevational view of the metering roller and alignment spindles, partially in section.

The fact that the film is able to twist as illustrated in FIG. 6D is the phenomenon that allows the idler rollers 44 and 46 to assume the requisite angular and lateral positions illustrated in FIG. 6A to FIG. 6C. It should be understood that the same twisting action may be found in the web sections illustrated in FIG. 6A and FIG. 6C to a greater or lesser degree.

The degree of film twist is dependent upon the spacing and therefore the length of the resultant film span between film reel 18 and idler roller 44; the two idler rollers 44 and 46 and the span between idler roller 46 and metering roller 38. In general, the film span between the fixed axis flanged rollers (i.e., metering rollers 38, supply reel 18, and take-up reel 20) and the "wobbly" idler rollers 44, 46, 48, and 50 associated therewith should be small in comparison to the distance between the adjacent idler rollers along the film path. This will minimize the amount of film twist required between the fixed axis flanged roller and the adjacent idler roller because a smaller correction angle is required over the greater span. Essentially, the shorter the film span between the two idler rollers, the more difficult it is for the film to make the necessary twist or adjustment required to compensate for any misalignment that may exist.

Even though the above discussion is directed to a specific film reel 18 and idler rollers 44 and 46 in FIG. 6A through FIG. 6C the same reasoning is applicable to film reel 20 and idler rollers 48 and 50, inasmuch as they are symmetrical about an axis of symmetry 68 which passes through a diameter of metering roller 38.

Figure 7:
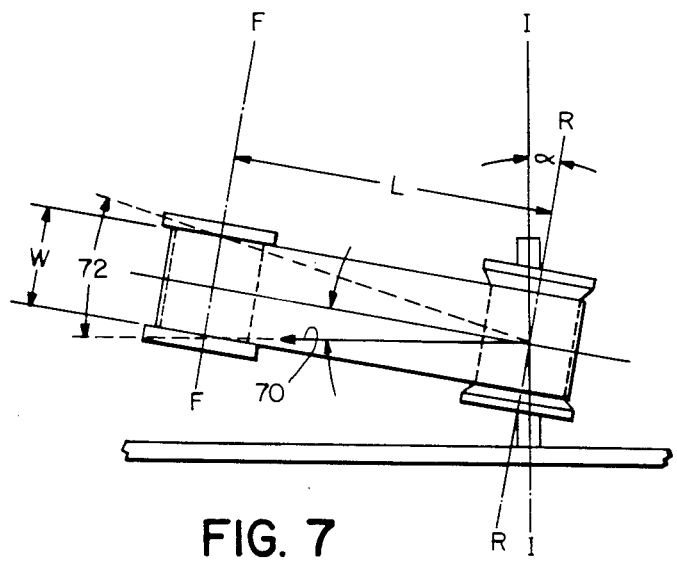
FIG. 7 is a schematic diagram showing the geometric relationship between a fixed roller and a "wobbly" roller.

To maintain a fully tensioned film span and prevent a slack edge from developing on the film between a flanged fixed axis element (such as film reels 18, 20 and metering roller 38) and an adjacent idler roller. The tension vector 70 within the film span must be supported between the two rollers as illustrated in FIG. 7. Thus if the tension vector 70 is allowed to move outside the tension zone 72 shown in FIG. 7 the opposite edge of the film will begin to go slack. It should be noted that use of a single "wobbly" idler roller is possible if the distance between the fixed axis elements is large enough to insure that the film can adjust in the span between the fixed axis elements and the "wobbly" idler rollers.

The guidelines for determining the allowable angle of tilt between the idler roller axis and its fixed shaft may be given by the following:

$$\text{Tan } \alpha \leq (W/2L)$$

where $\alpha$ = the angle between the axis F—F of a flanged fixed axis roller and the axis I—I of the idler roller shaft.
W = the web width
L = length of the web span.
Specifically it can be seen that if the length of this web span is 2.215 cm (0.872 inches) and this width of 16 mm film is 1.008 cm (0.630 inches) so that:

$$\text{Tan } \alpha \leq (0.630/2(0.872))$$

$$\alpha \leq 20°$$

Thus the allowable angle of tilt between the idler roller axis and the fixed axis F—F metering roller 38 is 20 degrees. This prevents the tension vector 72 from straying outside the flanges of the fixed roller. The axis of rotation R—R will align itself to be parallel with the axis F—F of a fixed axis roller within this range and in the film plane.

Anti-Clockspring Mechanism

An anti-clockspring mechanism is incorporated within film cassette 10 to prevent excess film from developing in the film path between the two film reels 18 and 20 prior to the cassette being inserted into the camera. It is also the function of the mechanism to prevent an operator from accidentally rotating a star drive 30, 32 on the outside of the cassette, thereby causing rotation of a film reel and introducing slack film into the film path.

A self-locking snubbing member 74 is biased by spring 76 into engagement against the reel pedestals 78 and 80 (FIG. 3) of the film reel shafts 26 and 28 and is intended to restrict the rotation of film reels 18 and 20 in a direction that may introduce excess film in the form of slack into the film path or rewinding previously exposed film onto the supply.

The snubbing member 74 is provided with teeth 82 which positively engage with teeth 84 and 86 about the periphery of the respective pedestals 78 and 80. As a result of this engagement, film reel 18 is prevented from rotating in a counterclockwise direction and film reel 20 cannot be rotated in a clockwise direction. However, rotation of film reel 20 in a counterclockwise direction and rotation of film reel 18 in a clockwise direction is permitted because the rotational forces in the directions just recited tend to oppose or counteract the biasing force of spring 76, thus allowing snubbing member 74 to be displaced sufficiently to allow teeth 84 and 86 on the respective reel pedestals 18 and 20 to ride over the teeth 74.

It should be noted that during loading of the film, the film reel 18 initially acts as the supply reel and can be rotated clockwise and film reel 20 initially acting as the take-up reel that can only be rotated in the counterclockwise direction. If film reel 20 is rotated counterclockwise to remove slack film snubbing member 74 is displaced out of the blocking engagement by moving against the force of spring 76. When film tension increases along the film path, resulting in counterclockwise rotational force on film reel 18 snubbing member 74 is drawn into engagement with pedestals 78, 80 prohibiting both film reels from further rotation in any direction.

If the operator wants to cinch additional film onto take-up reel 20, snubbing member 74 can be moved away from film reel pedestals 78 and 80 manually to allow free rotation of both the supply reel 18 and take-up reel 20.

Darkslide Operation

The film cassette 10 which is the subject of the present disclosure, has integral therewith a pair of selectively operable darkslide assembly 88 and 90, comprising respective aperture plates 92, 94 which are adapted to cover respective exposure windows 96 and 98 when the cassette is not operatively positioned in the camera, thereby preventing unnecessary exposure of the film residing within the cassette when the cassette is not in use.

The darkslides 88 and 90 are constructed such that the appropriate one of the darkslides automatically uncovers the exposure window that is aligned with one of the optical path means 100 or 102 when the cassette is inserted into the camera.

Figure 9:
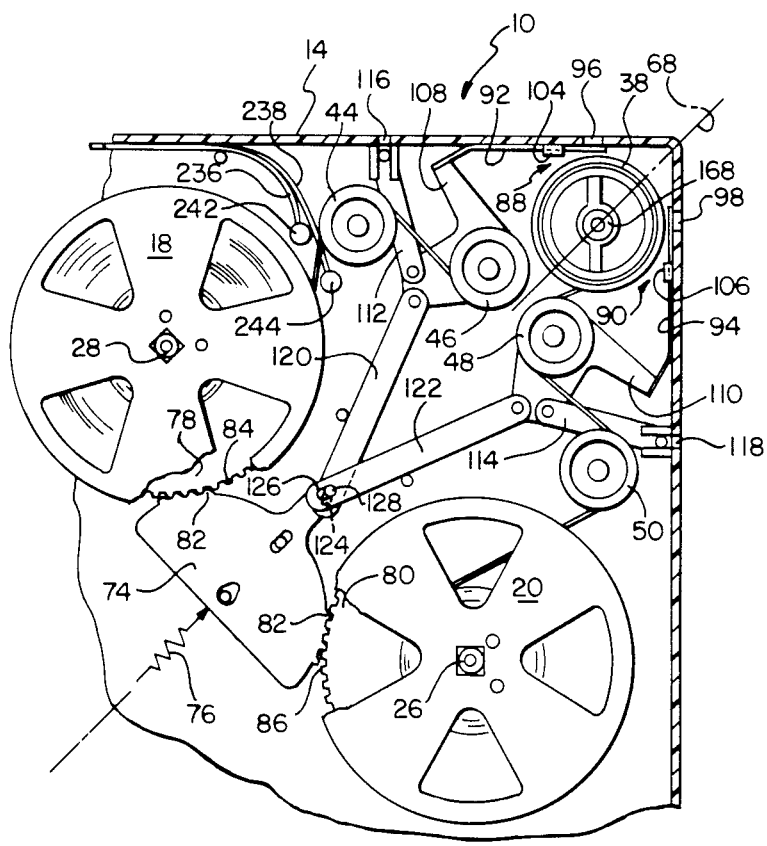
FIG. 9 is an elevational view of an enlarged portion of the film cassette illustrating the film path and anticlockspring mechanism in greater detail.

Referring particularly to FIG. 9, each aperture plate 92, 94 is comprised of a strip of spring material, such as steel which has the inherent characteristic of returning to a linear configuration after being relieved of a previously applied distorting force. Each aperture plate 92 and 94 is supported by parallel guides 104, 106 behind respective exposure windows 96 and 98 in the edge wall 14 of cassette base 12, which in turn are aligned with respective optical paths shown at numerals 100 and 102.

A first end of each aperture plate 92 and 94 is slidable in guide means in the edge wall 14 of the base 12 adjacent the corresponding exposure window. The second ends of the aperture plates 92, 94 are connected to respective darkslide cranks 108 and 110, which are pivotable about respective axes of idler rollers 46 and 48.

The first ends of the darkslide crank 108 and 110 are pinned to respective actuator links 112 and 114, and the other ends of these links are confined by respective slot 116 and 118 which is perpendicular to corresponding edge walls 14 adjacent exposure windows 96, 98. Also, at the same end each darkslide, crank 108 and 110 is pinned to a respective snubbing link 120 and 122. The other end of the snubbing links have respective slotted openings 124, 126 which are connected to snubbing member 74 by a pin 128.

Figure 10:
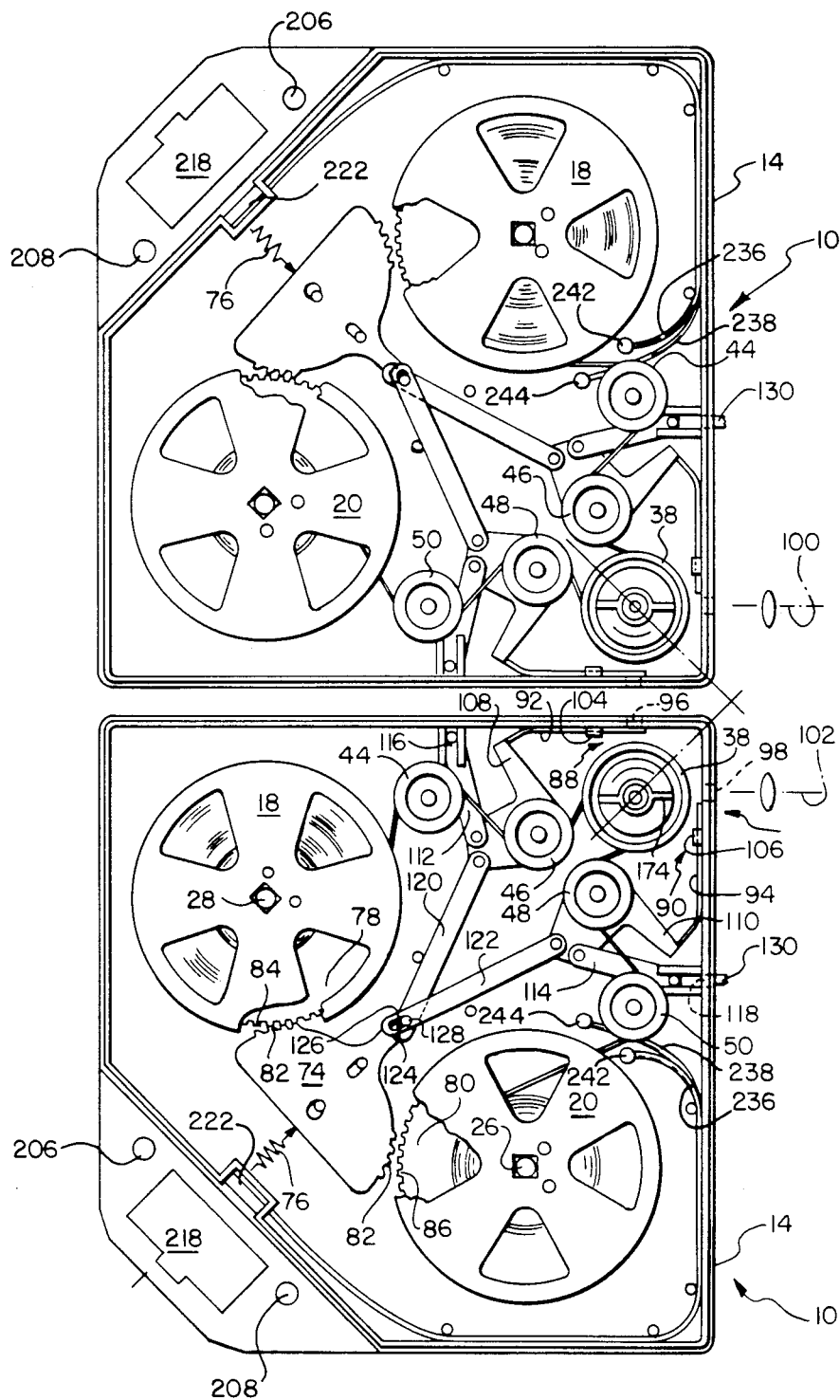
FIG. 10 is an elevational view of two film cassettes, with the covers removed, illustrating how they may be installed in a camera one above the other.

To automatically uncover the correct exposure window when the cassette is inserted into the camera, a push rod 130 enters through the edge wall 14 of each cassette 10, forcing actuating link 114 along the slot 118 in the housing and causing the darkslide crank 110 to rotate (clockwise as illustrated in FIGS. 9 and 10) and to withdraw plate 94 from the exposure window 98 located on the same wall of the cassette that push rod 130 entered. Insertion of the push rod 130 and the resulting rotation of the darkslide crank 110 causes snubbing link 122 to force the snubbing member 74 away from pedestals 78 and 80, allowing them to rotate freely. Both the aperture plate 94 and the snubbing member 74 are returned to their previous positions when the push rod 130 is withdrawn from the wall 14 of cassette 10.

It should be noted that only the darkslide on the same wall that receives the push rod 130 is actuated. The other darkslide 88 remains closed as a result of the lost motion in the slot 124 in the end of the snubbing link 120 and allows the snubbing member 74 to move away without actuating the other darkslide 88.

Cassette Loading Mechanism

Figure 2:
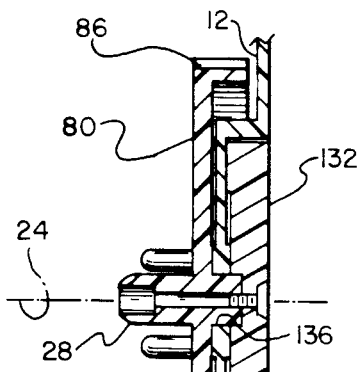
FIG. 2 is a sectional view taken along a diameter of an externally drivable film reel support pedestal shown in FIG. 1.

Because the film cassette 10 may be used in two different modes or orientations, it is necessary that film reels 18 and 20 be capable of being driven externally from either side of the cassette (either through base 12 or lid 16). When the drive is through base 12 of the cassette, star drives 132 and 134 (in the base 12) are keyed and fastened to the pedestal 78 and 80 and reel shafts 26, 28 respectively through a bearing surface 136 (FIG. 2) formed in base 12 of cassette 10. Alternatively, when the cassette is loaded the other way, film reels 18 and 20 are driven through lid 16, via star drives 30 and 32 which are engaged by the drives in the camera.

Figure 11:
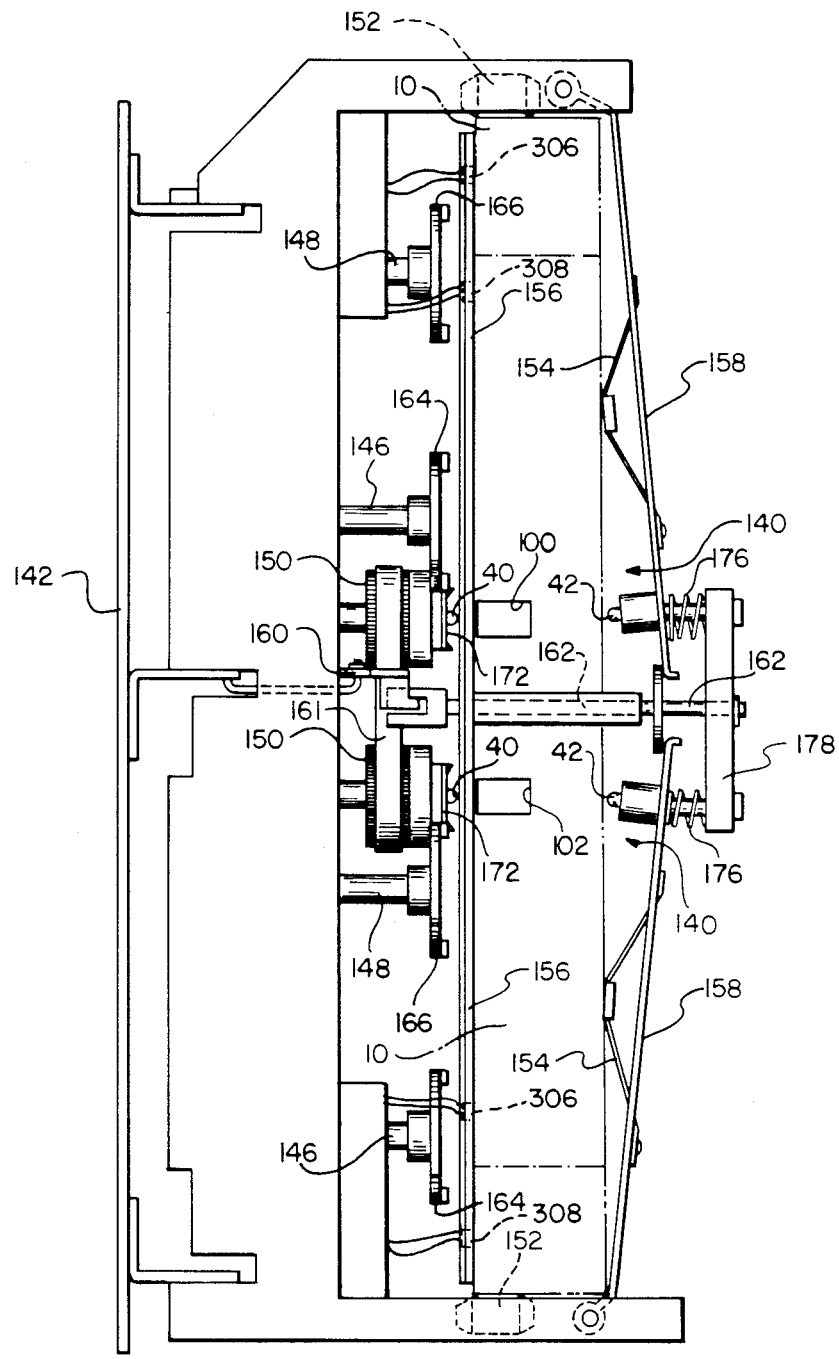
FIG. 11 is an elevational view of the film chamber in a microfilm camera with the access door shown in the open position.
Figure 12:
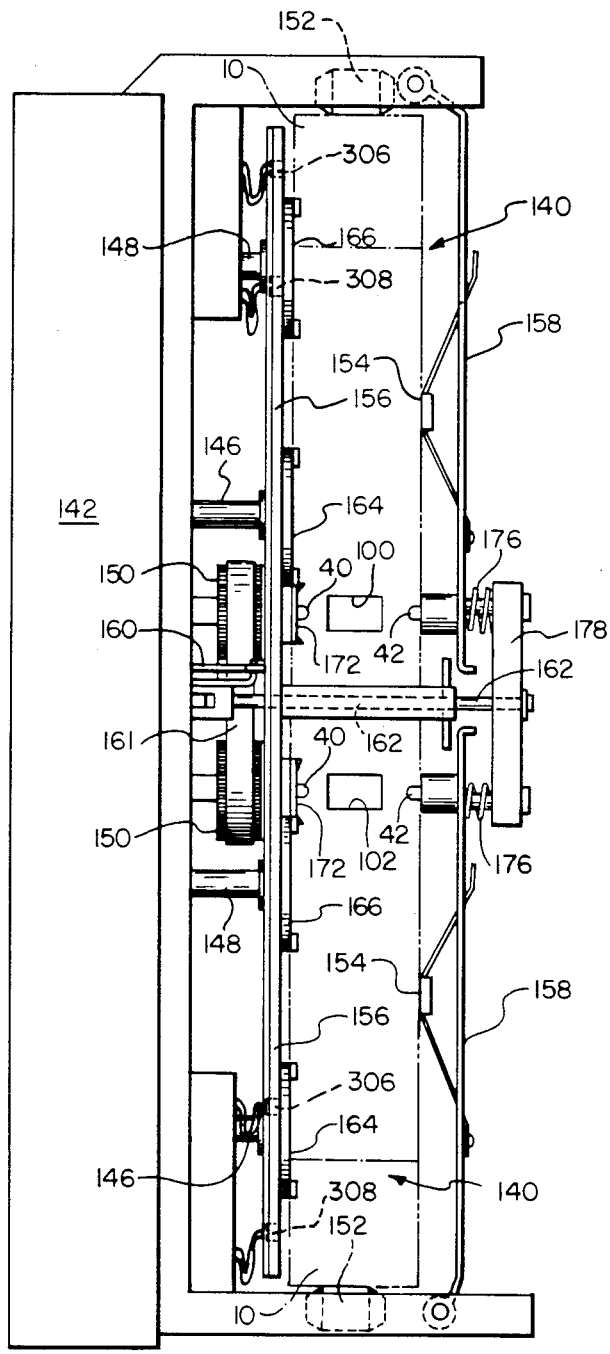
FIG. 12 is an elevational view of the film chamber in a microfilm camera with the access door shown in the closed position and external drive means properly positioned with respect to film cassettes.

Each film cassette 10 is manually loaded into the cassette chamber 140 through the cassette access door 142. Each film cassette 10 must be properly oriented prior to sliding it into the cassette chamber 140. Grooves and keyways (not shown) in each cassette 10 and within the cassette chamber 140 will allow full insertion of the cassette in only two orientations, as best shown in FIGS. 10, 11 and 12, which show one cassette positioned above the other, with the metering rollers 38 of the cassettes being adjacent one another. Each cassette 10 slides horizontally into cassette chamber 140 until the leading edge of the cassette engages a stop (not shown). Once either one or both of the cassettes are in place, the access door 142 may be closed.

Final positioning of cassette 10 relative to its corresponding reel drives, metering roller drive, and optical path occurs when the access door 142 is closed. Upon closing the access door, a mechanism within the cassette chamber 140 moves the cassettes laterally into proper rotation to the foregoing and clamps the cassettes into position via corresponding end and side leaf springs 152, 154. The cassette aligning mechanism comprises a reference plate 156, a cassette biasing plate 158, a cassette access door 142, an actuating lever 160 and a connecting rod 162. Closing of the cassette access door 142 causes actuating lever 160 to pivot and draw the connecting rod 162 to the left in FIG. 11 resulting in the cassette biasing plate 158 urging the cassette toward the corresponding reel drives and metering roller drives. Movement of the cassette biasing plate 158 will in turn force the cassettes to move laterally against three registration points (not shown) and into the film drives as mentioned above. Simultaneously, the reference plate 156 moves with the cassette to a position slightly behind the engagement end of the film drive elements. The use of a leaf spring 154 allows for a compliant connection between the cassette 10 and the biasing plate 158. The film drive shafts 146 and 148 are provided with respective compliant drive hubs 164, 166 which is allowed to assume the same orientation as the star drive 30, 32 in the base 12 of each cassette to connect the drive shafts to the respective cassette reels.

Because the film must be positioned for each cassette relative to each optical path 100 and 102 both laterally and angularly, to very precise tolerances, flanged metering roller 38 is rigidly located in the machine through use of rigid locating pins 40 and 42 on either side of flanged metering roller 38. The drive pins 40, 42 align and precisely locate metering roller 38 by engaging on either side of the metering roller 38 cone shaped surfaces 168, 170 centered on the axis of rotation 64 of metering roller 38 which mates with a spherical end portions on the pair of opposing non-rotating locating pins 40, 42. As a result of the seating motion of the cassette when it moves toward the drives, one end of the metering roller comes into contact with the spherical surface of the first fixed pin 40. The other non-rotating pin 42 pivots into contact with the other end of metering roller 38 through the motion of cassette biasing plate 158.

The non-rotating spindle located on the drive side of the cassette chamber is affixed to the casting. Around this stationary spindle for each cassette is a metering roller drive hub 172, which is driven by belt 161. The drive hub 172 contacts and drives against a drive lug 174 on metering roller 38 rotating it about the fixed pin 40. The opposite or second non-rotating pin 42 is fixed to cassette biasing plate 158. This pin 42 is spring loaded against the metering roller 38 by a spring 176 which is located between biasing plate 158 and one end of a yoke 178 located at one end of connecting rod 162. Each of the two pins 40 and 42 has been accurately pre-aligned relative to either optical path 100, 102 in the microfilm camera.

The cassettes are easily removed by opening cassette access door 142 and manually sliding the cassettes from cassette chamber 140. In a similar but reverse action to that described above, the opening of the access door 142 forces the connecting rod 162 and biasing plate 158 away from the cassette (to the right in FIG. 9) for an initial 0.118 cm (0.30 inch) of travel. This also disengages one of the non-rotating pins 42 from metering roller 38. The remaining movement of connecting rod 162 to the right is approximately 0.078 cm (0.20 inch) and forces reference plate 156 to the right beyond the drives, thus disengaging the cassette from the drives. Cassette biasing plate 158 also continues to move approximately an additional 0.078 cm (0.20 inch) with the remaining motion of the connecting rod 162.

Cassette Orientation

Figure 3:
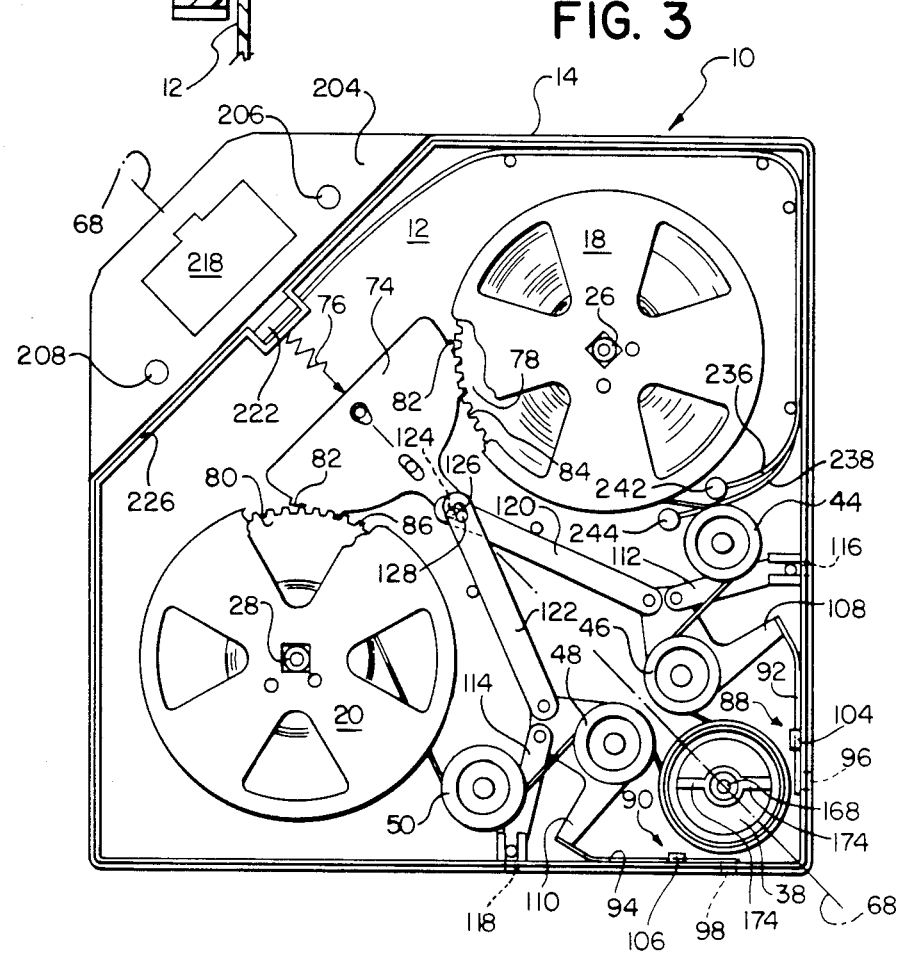
FIG. 3 is a plan view illustrating the film path within the cassette.

Thus it can be seen that film cassette 10 illustrated in FIGS. 3, 9 and 10 is symmetrical about an axis of symmetry 68 which passes through a diameter of metering roller 38 and bisects the corner of cassette 10. This axis of symmetry 68 is in a plane (not shown) extending between film reels 18, 20 and bisecting the corner of cassette 10, with two exposure windows 96 and 98 adjacent the corner of cassette 10 and at respective opposite sides thereof, all being in a symmetrical relation to the diagonal plane extending between film reels 18 and 20 and containing the axis of symmetry 68.

Film cassette 10 is configured to support a dual film system where two rolls of film are exposed simultaneously so that identical images are placed on both pieces of film in each cassette, located one above the other as shown in FIG. 10. If the filming mode is either simplex or duplex, the film is simply unloaded from the cassette after a single pass. After processing of the film, two identical rolls of film are provided, one may be used as a working film for viewing or used to make any required copies. The other film may be used as a backup or archival copy.

Duo or duo-duplex mode filming can be accomplished by removing the cassettes from the camera after exposing the first lateral half of the film. However, before the supply reels are depleted, each cassette 10 is "flipped" or rotated about its axis of symmetry 68 and reloaded into its cassette chamber 140 location in the camera so that the remaining lateral portion of the film is exposed through the second exposure window. This is a considerable improvement from existing microfilm systems which require taking the cassette must be to a darkroom, opening the cassette, removing the film from the take-up spindle and loading it onto the supply spindle, and rethreading the film onto the new take-up reel, closing the cassette and returning it to the microfilm camera for exposure of the remaining half of the film.

Film Information Controller and Memory

Figure 13:
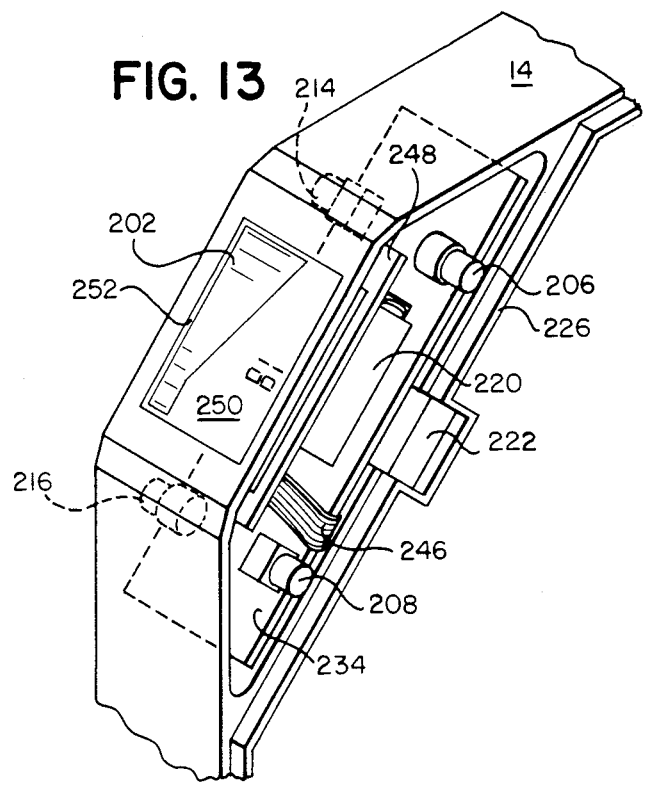
FIG. 13 is an enlarged view of that portion of the cassette shown as 200 in FIG. 1.

Referring now to FIGS. 1 and 13 and particularly to FIG. 1, numeral 200 shows generally the microcontroller based information controller and memory located in a truncated corner portion of the cassette 10. The Liquid Crystal Display (LCD) panel 202 is mounted in the edge wall 14 of cassette and is used to indicate to the operator information about the film in the cassette and the most recent use made of cassette.

FIG. 1 illustrates the information controller and memory section 200 with the main access panel 204 in place. Side 1 of panel 204 has a pair of openings for the infrared emitting diode (IRED) 206 and a phototransistor 208, which are used as part of the machine/cassette interface when alinged with corresponding phototransistor detectors 306 and IRED emitters 308 located adjacent the cassette chamber 140 in the photographic device when the cassette 10 is inserted into the cassette chamber 140 in its depicted "Side 1" mode of orientation. On the other side, side 2, of the information controller and memory section 200 of cassette 10 are another detector and emitter pair 214, 216, which are respectively located directly opposite the pair on Side 1. It should be noted that the IRED (emitters 206, 216) on each side of cassette 10 are diagonally opposite one another as are detectors 208, 214, providing a communications interface with the photographic device for either Side 1 or Side 2 cassette orientation.

Access panel 204 is intended to be removed only by service personnel and not intended for removal by the operator. However, the battery door 218 which is part of the access panel 204 may be opened by an operator, to gain access to the 9 volt battery 220.

Figure 15:
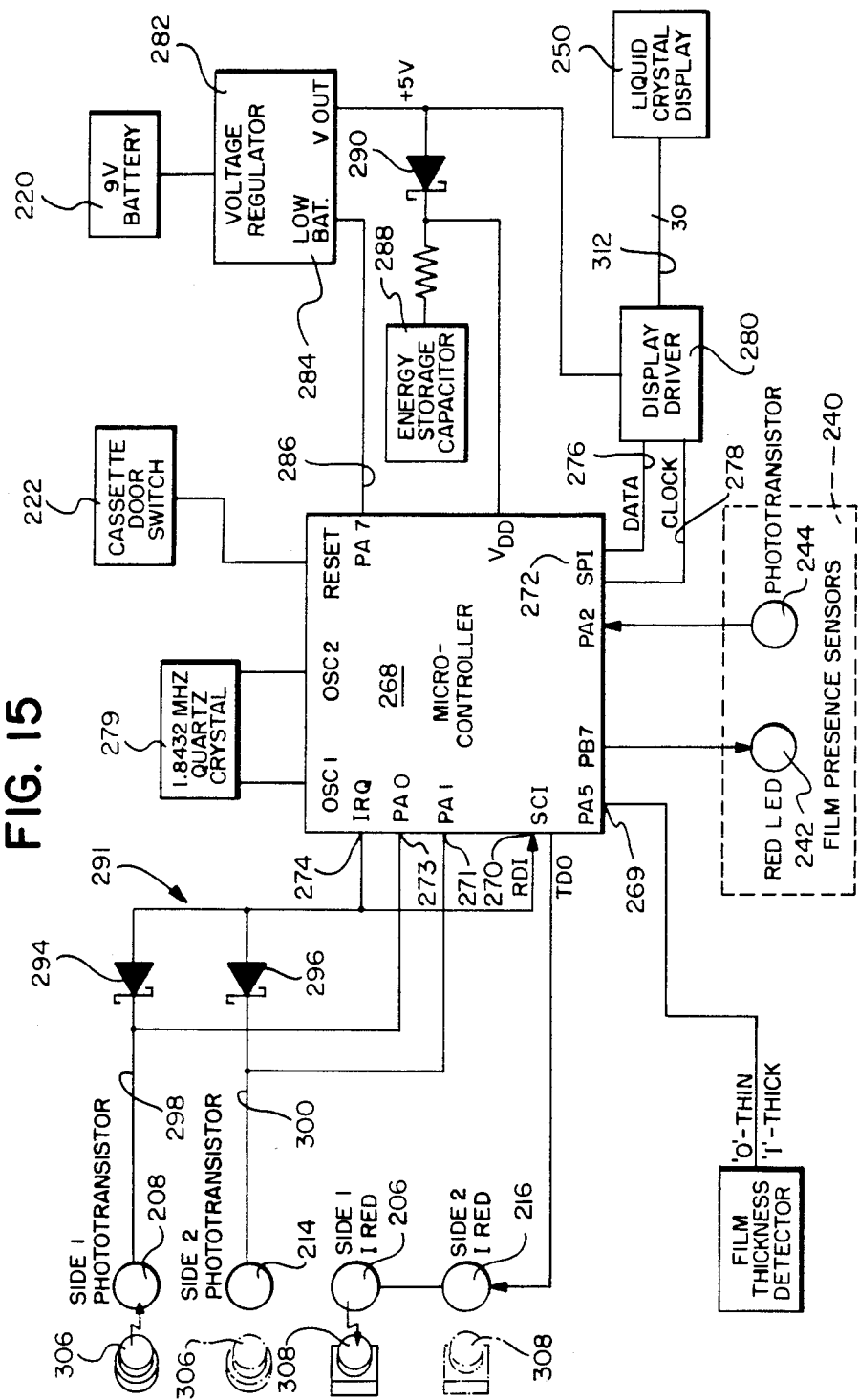
FIG. 15 is a schematic drawing of a microcontroller based controller for controlling the functions of the information controller and memory within the cassette.

A lid switch 222, which takes the form of a reed switch 224, is mounted in the divider wall 226 that separates the film chamber 140 from the area housing the information controller and memory 200. Reed switch is in the normally closed position but is opened by a magnet 230 embedded in lid 16 when the lid is closed and thereby brings the magnet into close proximity of the reed switch 224. As a result of this relationship, the switch is closed any time the lid 16 of cassette 10 is opened, resulting in an interrupt signal being sent to the microcontroller 268 (FIG. 15).

FIG. 13 shows an enlarged view of information controller and memory 200 in FIG. 1, but with access panel 204 removed so that the 9 V battery 220 may be seen. The IRED emitters 206 and 216 and the phototransistors 208 and 214 are carried by the information controller circuit board 234, which is mounted parallel to divider wall 226, thereby allowing door lid switch 222 to be conveniently connected to the controller circuit board 234. Also connected to controller circuit board 234 are the ends of wires 236 and 238, which pass through the divider wall 226 and are connected at their other ends to film presence sensor 240, which comprise a red LED 242 and a phototransistor 244 respectively located on opposite sides of the film path (best shown in FIGS. 3, 9, and 10).

One end of a six conductor flexible cable 246 is connected to the controller circuit board 234. The cable 246 passes under the battery 220 and the other end is connected to the display circuit board 248, which is located between the 9 V battery 220 and the liquid crystal display (LCD) 250, mounted in the outer edge portion. A clear plastic viewing window 252 covers LCD display 250 to protect the display.

Figure 14:
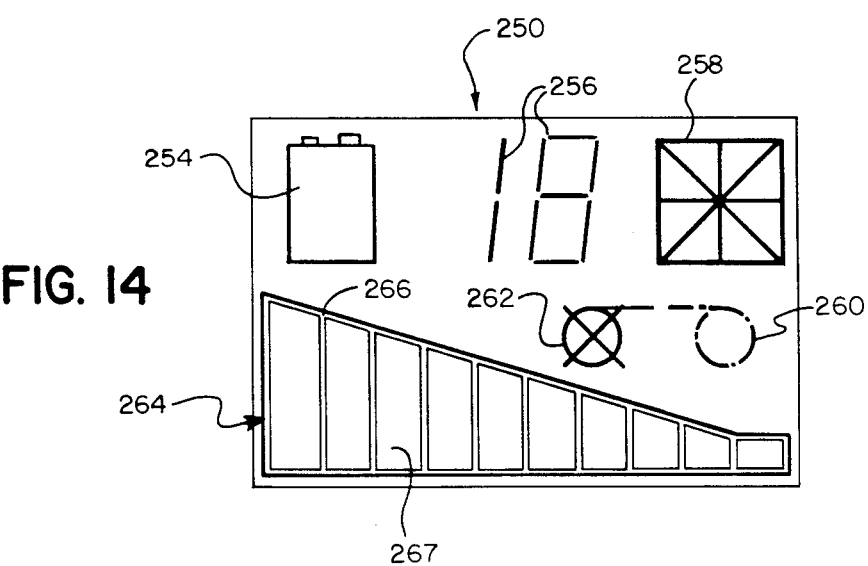
FIG. 14 is an enlarged view of the liquid crystal display shown as 250 in FIG. 13.

FIG. 14 illustrates an enlarged view of LCD display 250 which uses a number of icon's or symbols on the display to convey information about the cassette; e.g. a "low battery" symbol 254, a "job number" 256 (shown as "18" on the display), a "film orientation" symbol 258 and a "film present" symbol 260 or "film not present" symbol 262 (only one of these last two symbols would be activated at any one time). The film orientation symbol 258 is turned on only to indicate the use of side 2 in the duo mode. Additionally, a "film remaining" symbol 264, comprises border 266 enclosing 10 bar graphs 267, with each bar representing about 10% of the total film remaining. The fact that the bars on the left side of the display are larger than those on the right is intended to give a sense of direction to the film usage, i.e. full to empty, similar to a gas gauge on an automobile.

The film information center uses a Motorola 68HC0C4 microcontroller 268 (FIG. 15), which is a single chip 8-bit architecture microcontroller unit that includes read-only memory (ROM), random access memory (RAM), and several input/output (IO) functions including serial communication interface (SCI) 270, serial-peripheral interface 272 (SPI) interrupt circuit IRQ 274 and parallel IO circuits. Separate wires 276 and 278 are required for respective data and clock (signals). The timing functions for the microcontroller are derived internally from an internal clock circuit which gets its constant frequency feature from an external quartz crystal 279.

Nine-volt battery 220 supplies power for the microcontroller 268, the liquid crystal display 250 and the display driver 280, as well as for the red LED, IRED's, and phototransistors. A voltage regulator 282 converts the 9 volts from the battery 220 down to an operating voltage of approximately 5 volts. Voltage regulator 282 also has a low battery detect circuit 284 which provides a signal to the microcontroller via line 286 when the battery voltage is between 7.1 and 7.3 volts, which is close to the level required to maintain the operating voltage for the remainder of the circuit. However, the memory in the microcontroller will be retained down to two volts, which is far below the level that a weak battery signal will occur.

An energy storage device 288 is provided to maintain the memory in the microcontroller 268 during the time period when a weak battery is removed and a fresh battery is being installed. The energy storage device 140 could take many different forms—it could for example, be a large capacitor having enough stored energy to maintain the memory for a short time, i.e. 10 to 30 minutes. Alternatively, the charge storage device could be a conventional battery, or a rechargeable battery, i.e. a nickel cadmium battery, which would normally be maintained in a charged condition while 9 volt battery 220 is present and would only supply voltage to the microcontroller when 9 volt battery 220 is removed. Energy storage device 288 is not intended to operate the Liquid Crystal Display 250 and the remainder of the circuit during the battery changing operation. A schottky diode 290 will prevent energy storage device 288 from supplying power to liquid crystal display driver 280 and liquid crystal display 250, which might be too much of a load for the energy storage device 288 to maintain. After a new battery has been installed, the microcontroller 268 immediately updates the display 250, based on information retained in its memory.

When the film cassette 10 is not inserted in a photographic device, the microcontroller 268 is in a low power mode which is intended to greatly increase the life of battery 220. Upon receipt of a reset signal or an interrupt signal on the IRQ 274, the microcontroller 268 is switched out of its low power mode and into an active mode of operation. The active mode of operation can occur two ways: first, by switch 222 being opened in response to the closing of lid 16 and, second, by an interrupt signal occurring as a result of communications being initialized by the Main Controller Processor (MCP), which takes place upon the insertion of film cassette 10 into the photographic device.

The selection logic 291, in the form of Schottky diodes 294 and 296, is used to detect the presence of an interrupt signal on either line 298 or 300 and to direct that interrupt signal to the IRQ port 274 on microcontroller 268.

The response that occurs when the microcontroller 268 returns to the active mode, depends upon whether it received a reset signal or an interrupt signal. When microcontroller 268 receives a reset signal generated by the lid switch 222 when the lid 16 of the film cassette is opened, microcontroller 268 immediately performs a film presence check. This requires that microcontroller 268 turn on the red light emitting diode (LED) 242 and determine what effect if any, this will have on the phototransistor 244, which is connected to input port PA2 of the microcontroller 268. If the microcontroller detects no output from the phototransistor 244, this means that film is present and is blocking the radiation. Alternatively, an output from the phototransistor 244 indicates that no film is present. The microcontroller 268 operates the LED only long enough to monitor the output from the phototransistor 244 which not only conserves battery power, but reduces chances of film fogging. The film has a low sensitivity to radiation in the red portion of the spectrum, but is nevertheless exposed to the red LED for only short intervals and only at the leader portion of the film.

The microcontroller 268 can also be activated by receipt of an interrupt signal from the Main Controller Processor (MCP) or host computer (not shown) residing in the photographic device. This interrupt occurs upon insertion of the film cassette 10 into the cassette chamber 140 of the photographic device. Receipt of an interrupt signal on IRQ 274 (the machine/cassette interface) brings microcontroller 268 out of the low power mode. Microcontroller 268 transmits a reply via SCI 270 interface to indicate that it is ready for communication. The Main Controller Processor (MCP) in the photographic device then requests the information. The information currently stored in the film information controller is then transmitted across the SCI 270 machine/cassette interface. This transferred information may be used as set-up information for the photographic device if the operator desires.

Communications between the Main Controller Processor, the film information controller and memory 200 in the cassette 10 is through a machine/cassette interface in the form of an optical connection in a serial communications link. The serial link will be connected between IRED emitter 306 and phototransistor 308 in the cassette chamber of the photographic device, through either the cassette emitter and detector pair 206 and 208 or 214 and 216, depending on the orientation of the cassette.

After the microcontroller 268 has gone through its communications routine, has updated the Liquid Crystal Display, checked film presence, checked for a low battery and done whatever else it has been programmed to do, the software operates a command that returns the microcontroller 268 to the low power mode.

Microcontroller 268 is connected to a Liquid Crystal Display Driver 280 via a serial peripheral interface (SPI) line 272, which in turn drives a Liquid Crystal Display (LCD) 250 via 30 parallel outputs that form bus 312. Serial data is transmitted over SPI line 272 and is entered into the shift register (on the chip) on the rising edge of the clock signal on line 278. The data stream has a Start Bit (high), followed by 33 data bits (plus 2 trailing don't care bits). Data bit 1 controls the LCD segment connected to output 1, bit 2 controls output line 2, etc. If a data bit is high, the associated segment of the LCD connected to the corresponding output line is activated. Because the drive does not contain a decoder, this allows the flexibility of formatting the liquid crystal segment information externally. After 33 bits of serial data are placed in the chip shift register, the internal load transfers all 33 bits to the latches. The shift register is then cleared for the next set of data. The microcontroller 268 determines which segments must be on or off and sends a serial bit stream, accordingly.

Flow Charts Illustrating Program Organization

Having described the circuitry and interconnections which comprise the cassette information controller and memory 200 illustrated in FIG. 15, the way in which the microcontroller 268 is programmed to carry out the functions described above will now be described in terms of flowcharts by which the microcontroller 268 may be programmed. More details of the operation of the cassette information controller and memory, will be apparent from the discussion of the flowcharts.

Figure 16A:
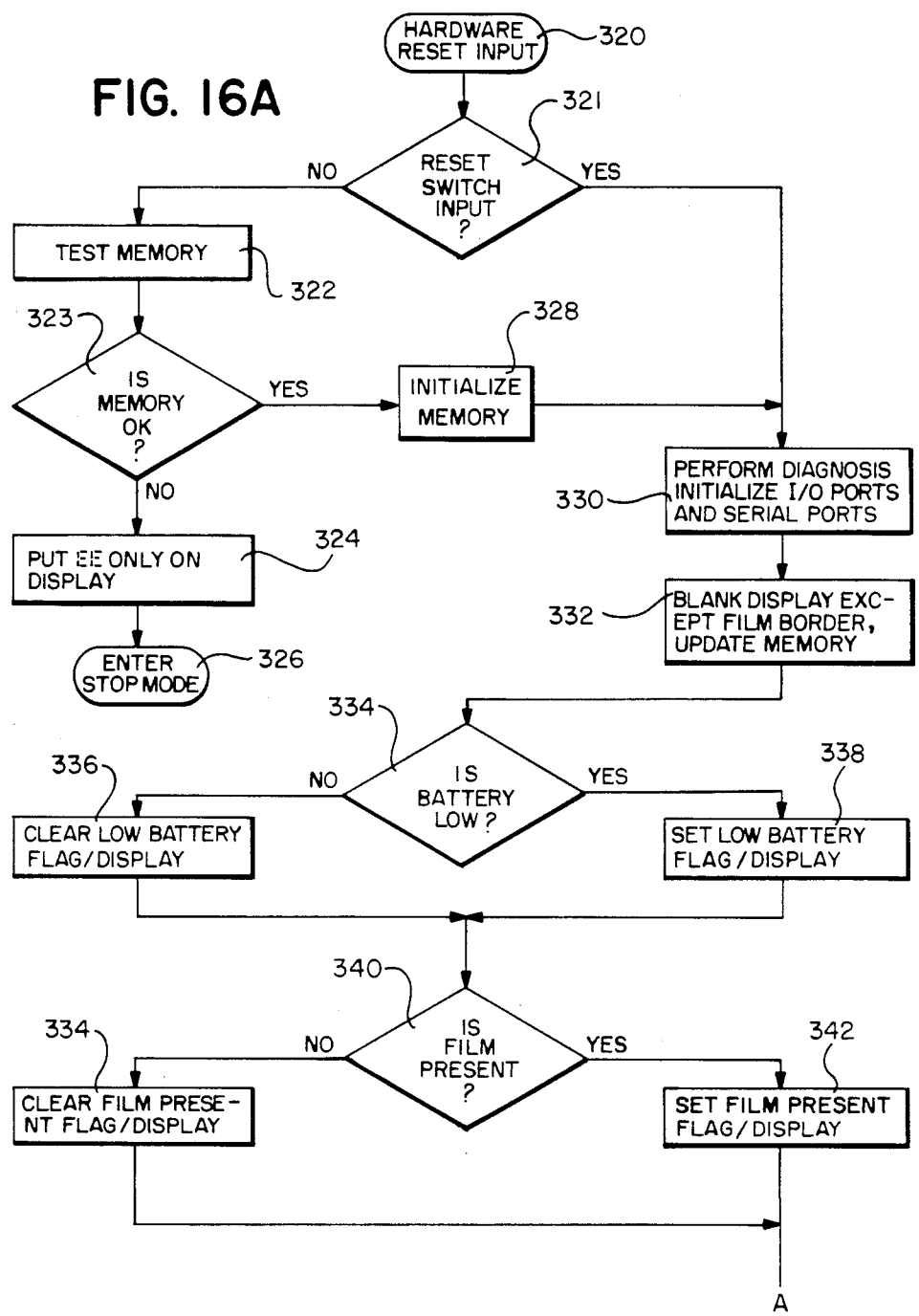
FIGS. 16a and b are flowcharts illustrating the functions of the cassette information controller and memory prior to the insertion of the cassette into the photographic device.
Figure 16B:
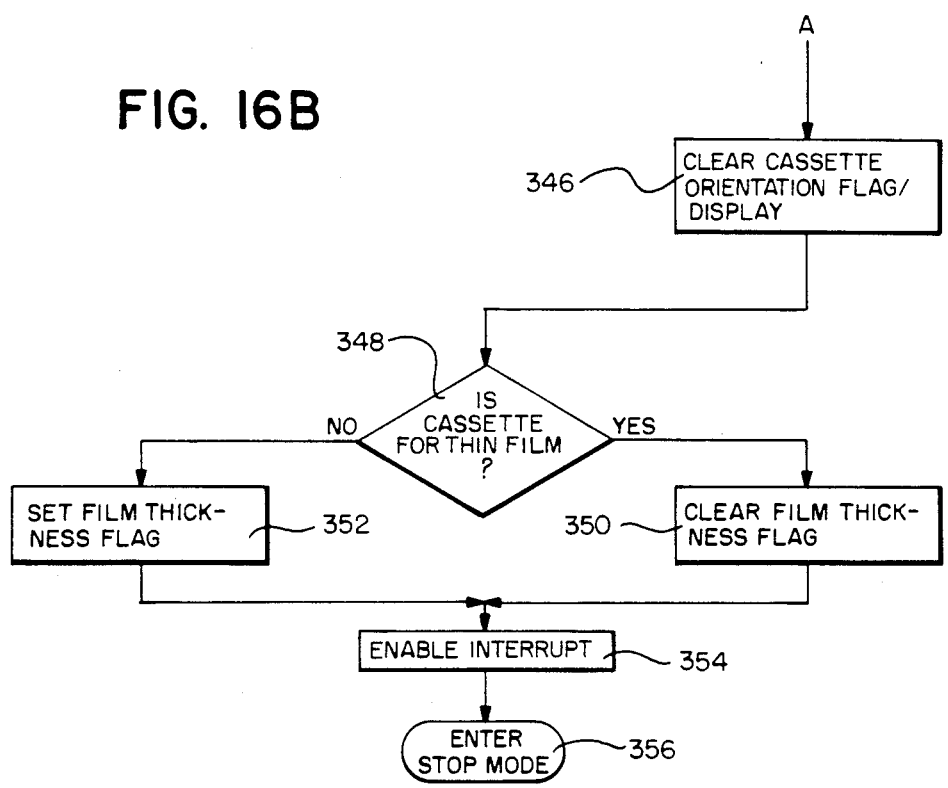

The flowchart illustrated in FIGS. 16a and 16b indicates the overall organization of the program by which the microcontroller 268 carries out the function of the cassette information controller and memory 200 prior to the insertion of the cassette in the photographic device. The program begins with hardware reset 320 input, which occurs when the nine-volt battery 220 is first connected to the microcontroller 268. The hardware reset 320 can also result from closed reed switch 224 which can occur if the lid 16 to the cassette 10 has been opened. As a result of certain test patterns written in the RAM memory, the microcontroller 268 is able to locate the source of the reset in instruction 321 (this will be discussed in detail in conjunction with the second flowchart).

If it is found that the reset 320 is due to a power on signal and the battery 220 is being connected for the first time, it is necessary to test the memory to insure that it is functioning properly, as indicated in instruction 322. In the event the memory is found to be defective in instruction 323, the microcontroller 268 will write "EE" as an error condition on the display according to instruction 324 and repairs may be required. Instruction 326 will then place the unit in a stop mode.

If the memory is found to be in proper working order, the memory is initialized as per instruction 328. The microcontroller 268 would then moves to instruction 330, which results in a diagnostics test and initialization of I/O ports and serial ports 270 and 272. The microprocessor moves to instructions 332, 334, which will be discussed in detail below in conjunction with the initiation of the reset signal in 320 and 321 as a result of the lid 16 having been opened.

If the reset input 320 is determined to be the result of a closed lid switch 222 caused by the cassette lid 16 being open. The microcomputer 268 does not initialize the memory as indicated in instruction 328 because the memory contains information stored from a previous use and any attempt to initialize the memory would result in the destruction of some or all of the information residing in the memory. The microcontroller 268 however, does perform other initialization functions as per instructions 330; e.g. a diagnostics test and initialization of I/O ports and serial ports 270 and 272. The microcontroller 268 clears all the status flags in accordance with instruction 330. The microcontroller executing instruction 332 blanks the entire display 250 except for the border 266 around film remaining symbol 264. The reason that the microcomputer 268 operates in this fashion is that it does not have information concerning the amount of film remaining. Therefore, after this reset, the entire display will be blank except for the border 266 around the film remaining symbol 264. The presence of this border symbol 266 on the display 250 signals the operator that both the display and the cassette controller and memory 200 are all functioning properly.

The program then continues to instruction 334 by which the microcontroller checks for a low battery condition, by reading the low battery detect circuit 284 to determine if the battery 220 is in good condition. If the battery is in good condition, instruction 336 is executed and the microcontroller 268 clears the flags and also turns off the low battery symbol 254 on the display 250. If the battery 220 is found to be defective, e.g. its output voltage is low, the microcontroller 268 will set the low battery flag in memory and turns on the low battery symbol on the display 250, according to instruction 338.

Instruction 340 causes the microcontroller 268 to check for the presence of film in the cassette using film presence sensors 240 (which include red LED 242 and phototransistor detector 244). If film is present, which causes the phototransistor 244 to fail to sense any light from the red LED 242, the microcontroller 268 sets the film present flag in memory and also turns on the film present symbol 260 on the display 250, in accordance with instruction 342. If film is not present, instruction 334 instructs the microcontroller 268 to clear the film present flag in memory and to turn on the film not present symbol 262 on the display 250.

Because the cassette orientation symbol 258 is not turned on until after the cassette 10 has been inserted into the cassette chamber 140, executing instruction 346, the cassette orientation flag is cleared in memory and the orientation symbol 258 is turned off on the display 250 prior to insertion of the cassette into the device.

When the cassette is inserted, instruction 348 is executed to determine if the cassette 10 contains thin or thick film. This is determined by reading input port 269 (PA5). There are two types of cassettes, one for thin film, the other one for thick film with each type of cassette having a different metering roller. The metering roller must be of a slightly different diameter depending on the thickness of film, depending on the thickness of the film to compensate for the thickness difference of the film in the focusing system. Certain jumper configurations are provided in the cassette in a resistive network (not shown) so that a logic "0" is placed on the input to port 269 (PA5) for thin film and a logic "1" is placed on the input to port 269 (PA5) for thick film.

If the microcontroller determines that thin film is present within the cassette, it will clear the film thickness flag in accordance with instruction 350. If it determines that thick film is being used it will set the film thickness flag in accordance with instruction 352. After having determined the film thickness, the microcomputer 268 will enable external interrupt according to instruction 354 before going to instruction 356 which puts the microcomputer in the "STOP MODE".

Figure 17B:
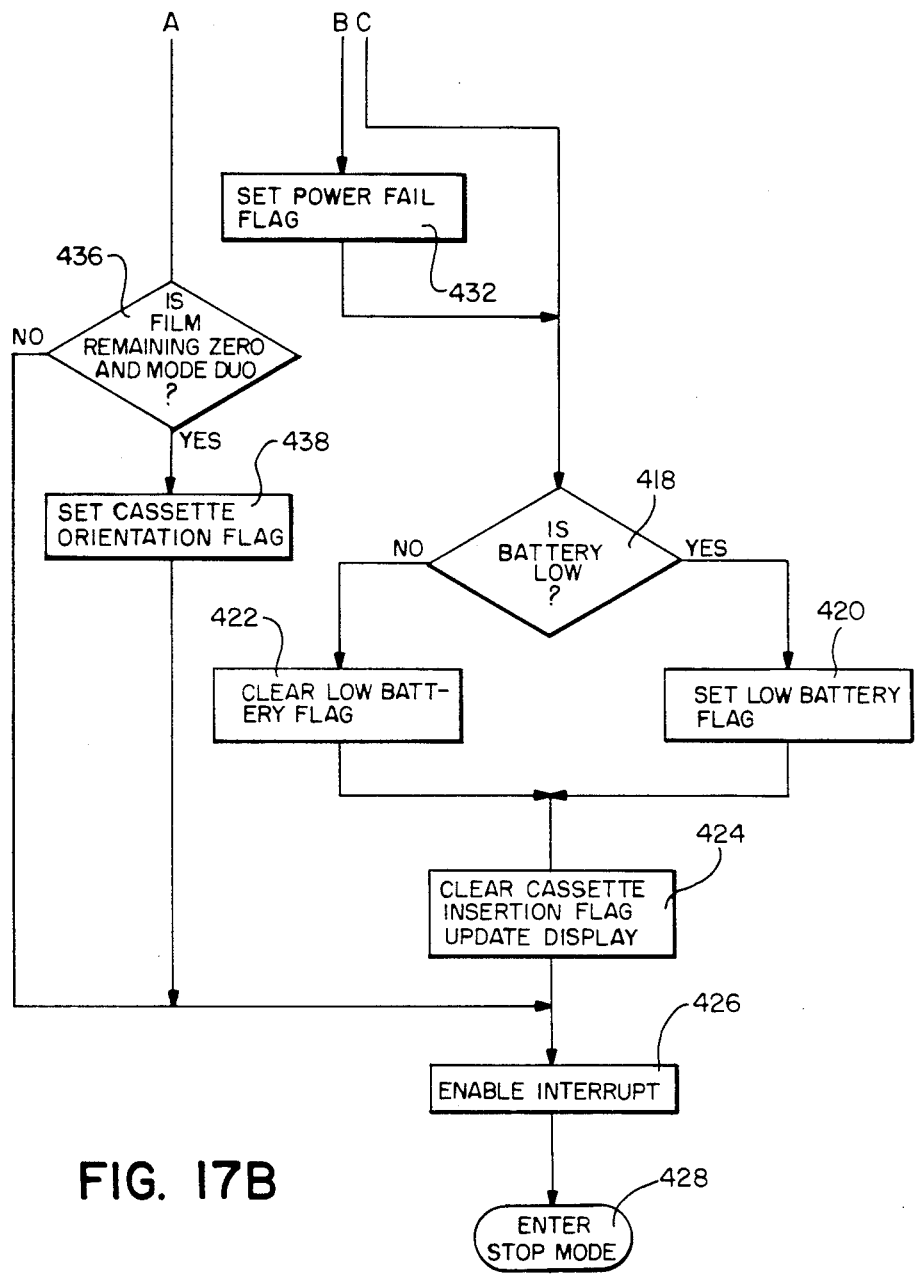
Figure 17C:
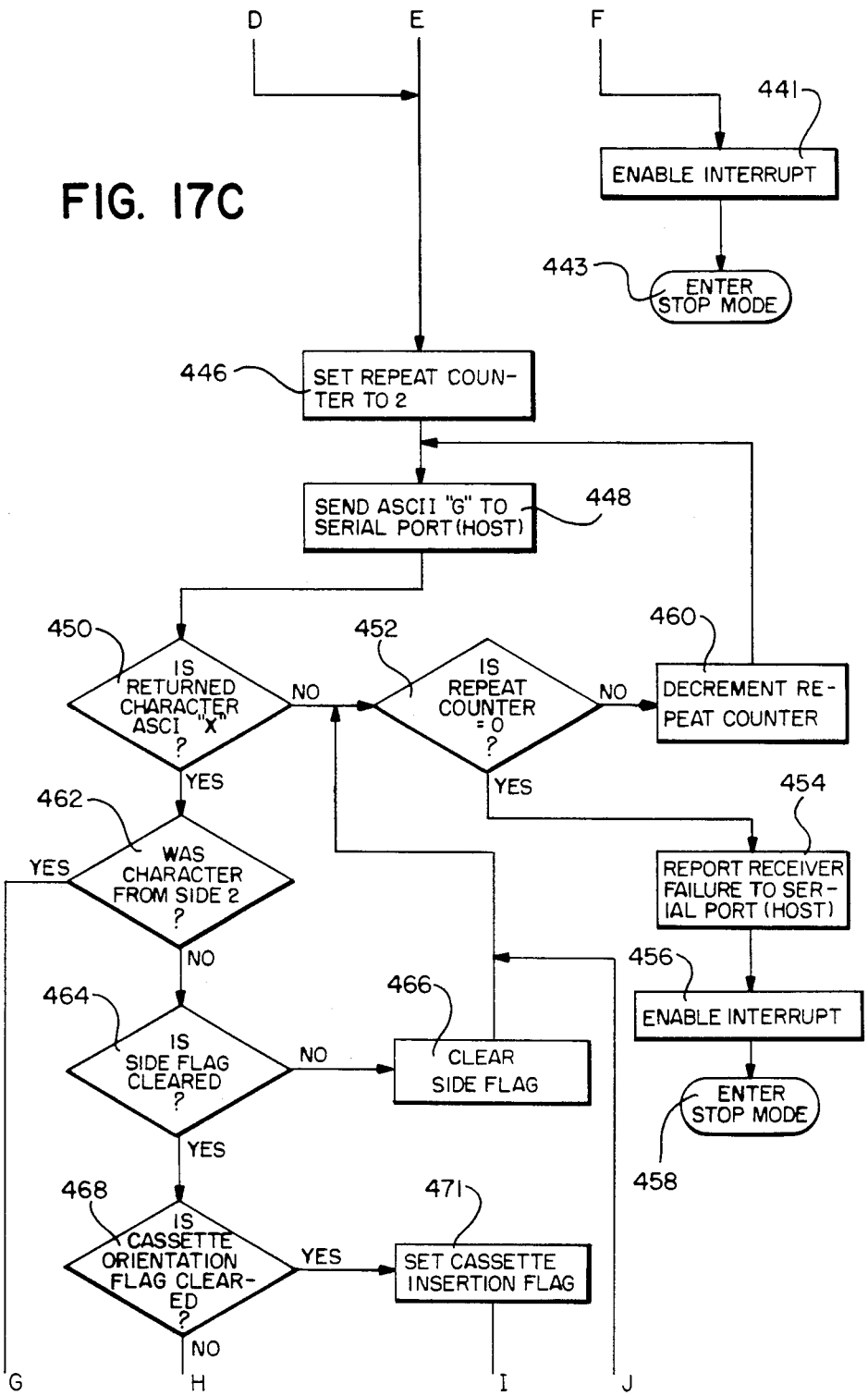
Figure 17D:
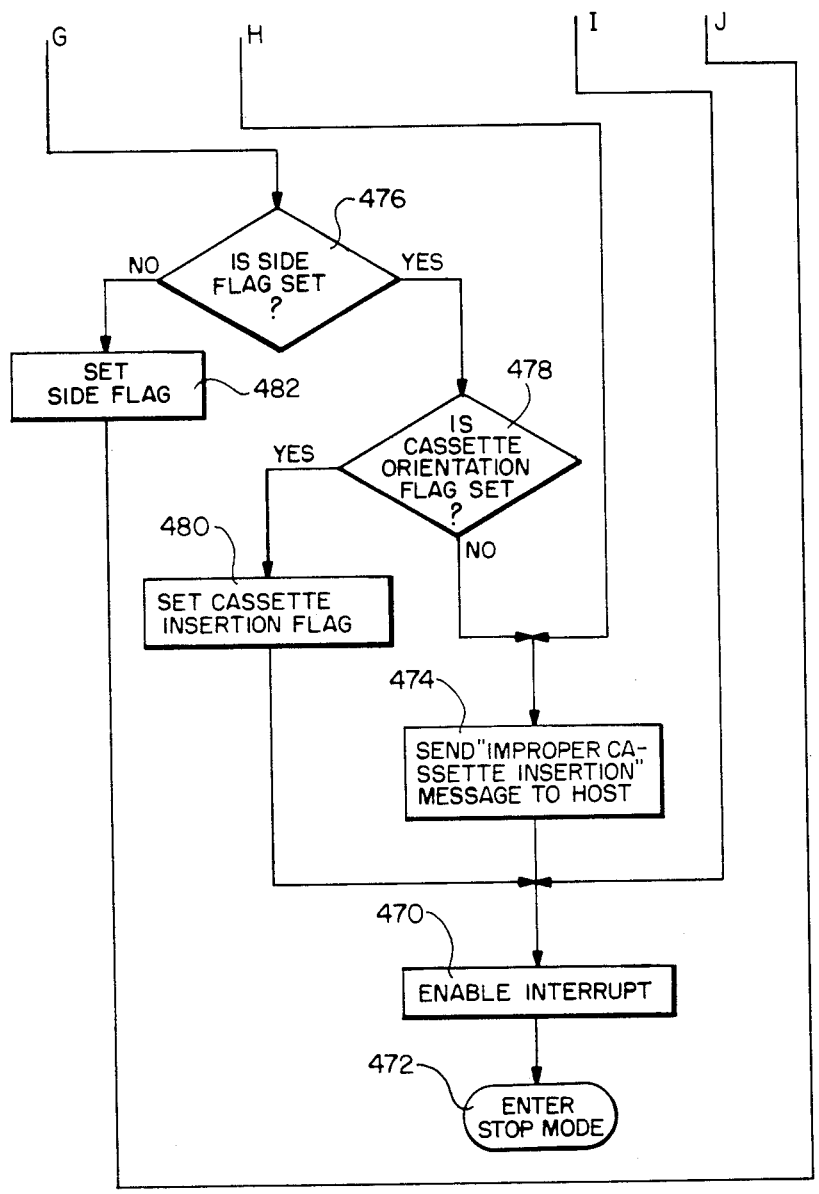

Another manner of getting the microcontroller 268 into operation from a stop mode is via an external interrupt 400 (FIGS. 17A, B, C, D) on the serial port 270. and IRQ input 274. When this external interrupt 400 occurs, the microcontroller 268 exits the stop mode 402 and reads the parallel inputs lines 271 and 273 and then disables the interrupt 274 according to instruction 404. Next, the microcontroller 268, in accordance with instruction 406 looks for a low battery signal on line 286. If the battery 220 is low, the microcontroller 268 sets the low battery flag in memory and turns on the low battery symbol 254 on the display 250 according to instruction 408. If the battery 220 is not low, the microcontroller 268 in executing instruction 410, will clear the low battery flag in memory and turn off the low battery symbol 254 on the display 250.

Microcontroller 268 must also determine whether the cassette 10 is being inserted for the first time, or has been inserted before. This is done by checking the status of the cassette insertion flag according to instruction 412. If this flag is not set, it means that the cassette 10 is being inserted into the photographic device for the first time. Accordingly, microcontroller 268 will then be required to determine if the cassette is properly inserted in the cassette chamber 140, which may be accomplished by having the information controller and memory 200 communicate with the MCP. However, if the cassette 10 was previously inserted and one or more interrupts have occurred after that insertion, then microcontroller 268 is required to read the next data byte from serial port 270 as per instruction 414. Microcontroller 268 must determine by interpreting the data byte whether or not the cassette 10 is about to be removed according to instruction 416. If the data byte indicates that the cassette 10 is about to be removed, then microcontroller 268 checks the low battery signal on line 268 as per instruction 418 and, as before if the battery 220 is low, the low battery flag is set in memory according to instruction 420. If the battery 220 is not low, the microcontroller 268 clears the low battery flag in memory in accordance with instruction 422. After either setting or clearing the low battery flag, microcontroller 268 goes to instruction 424, where it clears the cassette insertion flag, in anticipation that the cassette 10 is about to be removed from the photographic device. After clearing the cassette insertion flag, microcontroller 268 updates the display 250 by turning on the low battery symbol. If the battery is low, it also turns on the film present symbol 262 and the bar graph of the film remaining symbol 264. It also turns on the job number 256 under instruction 424. The microcontroller then executes instructions 426 and 428, which enable external interrupt and then causes microcontroller 268 to enter the stop mode.

If, under instruction 416, microcontroller 268, has determined that the cassette 10 is not about to be removed from the cassette chamber 140, but in interpreting the next data byte, it receives an indication that there was a failure of AC power, as determined by instruction 430. The microcontroller 268 then sets the power fail flag according to instruction 432. It then checks the low battery signal as per instruction 418 and proceeds as before.

If AC power has not failed, microcontroller 268 executes instruction 434 and takes all remaining data and stores it in memory, because that data can be information required for machine set up as well as other information that needs to be stored in the information controller and memory 200. Microcontroller 268 then clears the power fail flag as part of instruction 434 and proceeds to instruction 436, which has microcontroller 268 determine if the remaining film is zero and if the mode of operation is duo, as set forth in instruction 436. If either of these conditions is not met, it proceeds to instructions 426 and 428, which are to enable external interrupt and to enter stop mode respectively. However, if both conditions are met, micorcontroller 268 sets cassette orientation flag in memory, according to instruction 438, and then enters the stop mode after enabling external interrupt according to instructions 428 and 426.

Referring back to instruction 412, which determines if the cassette is being inserted for the first time, the microprocessor checks whether or not the cassette insertion flag is set in memory. If the cassette insertion flag is not set, this means that the cassette is being inserted for the first time and that this is the first interrupt coming from the serial port 270 after the cassette was inserted in the cassette chamber 140. Microcontroller 268 then proceeds to instruction 440, where it determines if the interrupt came from side 2 of the cassette 10 (interrupts can come from either side 1 or side 2 depending on the orientation of the cassette 10 in the cassette chamber 140). If the interrupt did not come from side 2 of the cassette, microcontroller 268 determines if the interrupt came from side 1, according to instruction 442. In the event the interrupt did not come from either sides 1 or 2, then it is considered a false interrupt, or what is commonly known as a "glitch of noise". Microcontroller 268 then returns to the stop mode 443 after enabling the interrupt 441.

If the interrupt did not come from side 2 as determined in instruction 440 and it is found in response to instruction 442, that it came from side 1, the microcontroller then proceeds to instruction 444, where it clears the side flag and proceeds to instruction 446 where it sets the repeat counter to 2.

The repeat counter provides three consecutive trials or attempts at establishing proper communication with the MCP in the photographic device. The microcontroller 268 then proceeds to instruction 448 where it sends an ASCII "G" character to the MCP (host computer). This commences the beginning of communication with the MCP to determine the proper orientation of the cassette 10. In response to the ASCII "G", the MCP returns an ASCII "X" and the microcontroller 268 checks the received character to determine if it is an "X", in accordance with instruction 450. In the event the received character is not an "X", the microcontroller 268 executes instruction 452 and checks to determine if the repeat counter is 0. If the counter is 0, the microcontroller reports a receiver failure to the MCP in accordance with instruction 454. This means that the receive line of the serial communication port 270 has failed and proper information does not return on it. After this failure is reported to the MCP, the microcontroller proceeds to instructions 456 and 458, respective which enable external interrupt and then causes the microcontroller to enter the stop mode. In the event the repeat counter is not 0, the microcontroller decrements the repeat counter according to instruction 460 and returns to instruction 448, thereby sending another "G" to the MCP. Returning to instruction 440, if it is determined that the interrupt came from side 2, microcontroller 268 proceeds to instruction 469, which sets the side flag before the microcontroller proceeds to instructions 446, 448, and 450 as previously described.

If the received character is an "X", the microcontroller 268 determines if the "X" came from side 2, per instruction 462. If the "X" did not come from side 2, it is evident that it came from side 1 and the microcontroller 268 proceeds to instruction 464 to determine if the side flag is clear. A cleared side flag indicates that the microcontroller's previous interrupt came from side 1. If, according to instruction 464, it is found that the side flag is not cleared, (meaning that it is set), this means that this "X" came from side 1, and the previous interrupt came from side 2. This is a conflict since both the interrupt and the "X" should have come from the same side if everything is operating properly. The microcontroller, after clearing the side flag in instruction 466, tries the transmission again viz instructions 452, 460, 448 and 450. If instruction 464 determines that the side flag is not cleared, the microcontroller 268 clears the side flag in accordance with instruction 466 then goes and checks if the repeat counter is set at 0 as in instruction 452. The mcircontroller then proceeds through instructions 460, 448 and 450 as described previously.

If microcontroller 268 has determined that the side flag is cleared, after executing instruction 464, it goes on to instruction 468 which requires the microcontroller 268 to determine if the orientation flag is also cleared, meaning that the cassette is to perform the filming operation with side 1 in position. In addition, a cleared side flag also means that the communication and the interrupt occurred on side 1. If it finds the orientation flag cleared, it determines that the cassette is inserted properly because communication took place on side 1. The microcontroller then sets the cassette insertion flag in accordance with instruction 471, indicating that the cassette was properly inserted. The microcontroller 268 then enables external interrupt and enters the stop mode in accordance with instructions 470 and 472. If the microcontroller finds, in executing instruction 468, that the cassette orientation flag is not cleared, this is an indication that the cassette is not inserted properly because a set orientation flag indicates that filming is to take place on side 2 and that the communication took place on side 1. At this time, the microcontroller executes instruction 474 and sends an "improper cassette insertion" message to the MCP. It then enables external interrupt and enters the stop mode, as set forth in instructions 470 and 472 respectively.

Returning to instruction 462, which asks whether the character was received from side 2; ff the answer is "yes", the program moves on to instruction 476, which has the microcontroller determine if the side flag was set, thereby indicating that the previous interrupt was from side 2 and that the "X" recently received came from side 2. This is a confirmation that communication is definitely through side 2. At this time, the microcontroller 268 executes instruction 478 and determines if the orientation flag is set. If the orientation flag is set, it means that the cassette was inserted properly, because a set orientation flag indicates that the cassette 10 is to be filmed on side 2 and side 2 is also the side on which the communication occurred. The microcontroller then sets the cassette insertion flag in accordance with instruction 480 and then enables external interrupt and enters the stop mode, as per instructions 470 and 472 respectively. However, if it is determined that the cassette orientation flag is not set, this means that the cassette is to be filmed on side 1, but communication took place on side 2, indicating that the cassette is now inserted incorrectly. At this time, the microcontroller 268 performs instruction 474 and sends an "improper cassette insertion" message to the MCP. The microcontroller then executes instructions 470 and 472, entering the stop mode after enabling the interrupt.

Once again, returning to instruction 462, if it is determined that the character "X" was received on side 2, the microcontroller goes to instruction 476 where it determines if the side flag is set. If the side flag is not set, this means that the previous interrupt came from side 1, but if it is determined that the received character "X" camera from side 2, the microcontroller then sets the side flag in accordance with instruction 482. The microcontroller 268 then moves to instruction 452 where it checks the repeat counter. If the counter is not at zero, the microcontroller 268 will then send another "G", expecting to receive an "X" from the MCP and then proceeds through 460, 448 and 450 as previously described.

Advantages and Industrial Applicability

The present invention is useful in a camera, microfilmer or tape machine in which a web material is supplied in a cassette, cartridge or magazine. The invention is advantageous in that the cassette has an electronic display to convey a variety of conditions and parameters about the web material contained in the cassette. The invention has the further advantage that the cassette contains its own power source to operate the display and to update the memory circuits and/or display with information relating to conditions the cassette has experienced while not in the camera or recording device. A further advantage of the inventive cassette is its ability to establish a two-way communications path between the memory in the cassette and the host device for renewing or updating a portion of the data recorded in the memory within the cassette, or reproducing the data previously stored in the memory for use by the host device.

What is claimed is:

1. In the combination of a photographic device and a film cassette, said cassette having a housing including supply and take-up means within said housing, the improvement comprising:

electronic memory means carried by said housing, said memory means including semi-conductor memory circuits wherein information as to the cassette or film contained thereinis represented by the state of said circuits;

display means carried by said housing to present information from said memory means relating to said cassette and said film;

a power source carried by said housing to operate said memory means and said display means when said cassette is removed from said photographing device;

interface means for establishing a two-way communications path between said memory means and said photographing device when said cassette is operatively positioned in said device;

recording-reproducing means associated with said photographic device for renewing a portion of the data recorded in said memory means via said interface means; and reproducing means associated with said photographic device for reproducing the data previously stored in said memory means for use in said photographic device.

2. The combination set forth in claim 1 wherein said display means is a liquid cyrstal display screen.

3. The combination set forth in claim 1 wherein said memory means further includes a microprocessor device.

4. The combination set forth in claim 3 wherein said cassette further includes switch means carried by said cassette housing for providing a signal to said microprocessor when said cassette is opened.

5. The combination set forth in claim 1 wherein said power source is a battery.

6. The combination set forth in claim 5 wherein said battery is rechargeable by said photographic device.

7. The combination set forth in claim 1 wherein said interface means is an electro-optical coupling.

8. The combination set forth in claim 7 wherein said electro-optical coupling is a pair of infra-red emitters and detectors.

9. In a cassette for use in a photographic device including electronic circuit means, said cassette comprising a housing including supply and takeup means within said housing, the improvement comprising:

electronic memory means carried by said housing, said memory means including semi-conductor memory circuits wherein information as to the cassette or film contained therein is represented by the state of said circuits;

display means carried by said housing to present information from said memory means relating to said cassette and said film;

a power source carried by said housing to operate said memory means and said display means when said cassette is removed from said photographic device; and interface means carried by said cassette and cooperable with said device when said cassette is installed therein for establishing two-way communication between said cassette and said electronic circuit means of said device.

* * * * *